US012376176B2

(12) United States Patent
Pezeshki et al.

(10) Patent No.: US 12,376,176 B2
(45) Date of Patent: Jul. 29, 2025

(54) SUSPENSION OF BEAM OR LINK RECOVERY FOR A FAILURE EVENT

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Jingchao Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/356,844

(22) Filed: Jul. 21, 2023

(65) Prior Publication Data

US 2023/0363034 A1 Nov. 9, 2023

Related U.S. Application Data

(63) Continuation of application No. 17/249,394, filed on Mar. 1, 2021, now Pat. No. 11,758,606.

(Continued)

(51) Int. Cl.
*H04W 76/19* (2018.01)
*H04B 7/06* (2006.01)
(Continued)

(52) U.S. Cl.
CPC ........ *H04W 76/19* (2018.02); *H04B 7/06964* (2023.05); *H04W 72/044* (2013.01); *H04W 74/0833* (2013.01); *H04W 76/38* (2018.02)

(58) Field of Classification Search
None
See application file for complete search history.

(56) References Cited

U.S. PATENT DOCUMENTS 10,644,974 B2   5/2020  Novlan et al.
2019/0090226 A1  3/2019  Wang et al.
(Continued)

FOREIGN PATENT DOCUMENTS

CN    110326326 A    10/2019
WO   2018064483 A1    4/2018
(Continued)

OTHER PUBLICATIONS

3GPP: "3rd Generation Partnership Project, Technical Specification Group Radio Access Network, NR, Medium Access Control, Protocol Specification (Release 15)", TS 38.321, V15.8.0 (Dec. 2019), 3GPP Standard, Technical Specification, Mobile Competence Centre, 650, Route Des Lucioles, F-06921 Sophia-Antipolis Cedex, France, vol. RAN WG2, No. V15.8.0 , Jan. 7, 2020, 7 Pages, Section 5.17.

(Continued)

*Primary Examiner* — Jamaal Henson
(74) *Attorney, Agent, or Firm* — Harrity & Harrity, LLP/QUALCOMM Incorporated

(57) ABSTRACT

Various aspects of the present disclosure generally relate to wireless communication. In some aspects, a user equipment (UE) may determine that a failure event for a beam or a link, between the UE and a base station, is occurring or will occur, and transmit a message to the base station indicating that the UE is refraining from performing a recovery procedure for the beam or a link for a time duration. Numerous other aspects are provided.

30 Claims, 23 Drawing Sheets

Related U.S. Application Data

(60) Provisional application No. 62/985,830, filed on Mar. 5, 2020.

(51) Int. Cl.
*H04W 72/044* (2023.01)
*H04W 74/0833* (2024.01)
*H04W 76/38* (2018.01)

(56) References Cited

U.S. PATENT DOCUMENTS

| | | |
|---|---|---|
| 2019/0098520 A1 | 3/2019 | Kim |
| 2019/0150010 A1 | 5/2019 | Kwon et al. |
| 2019/0173740 A1* | 6/2019 | Zhang ................. H04L 41/0894 |
| 2019/0215863 A1 | 7/2019 | Kim et al. |
| 2019/0215888 A1 | 7/2019 | Cirik et al. |
| 2019/0268790 A1 | 8/2019 | Kwon et al. |
| 2019/0281480 A1* | 9/2019 | Wei ...................... H04B 7/0695 |
| 2020/0107331 A1* | 4/2020 | Tsai ....................... H04B 7/088 |
| 2020/0137657 A1 | 4/2020 | Chavva et al. |
| 2020/0177265 A1* | 6/2020 | Guan .................... H04B 7/088 |
| 2020/0177424 A1 | 6/2020 | Noh et al. |
| 2020/0244413 A1 | 7/2020 | Takeda et al. |
| 2020/0336195 A1* | 10/2020 | Hu ........................ H04W 74/02 |
| 2020/0374960 A1 | 11/2020 | Deenoo et al. |
| 2020/0413273 A1 | 12/2020 | Turtinen et al. |
| 2021/0028849 A1* | 1/2021 | Chin .................. H04B 7/06964 |
| 2021/0153281 A1 | 5/2021 | Deogun et al. |
| 2021/0218462 A1 | 7/2021 | Shi et al. |
| 2021/0258062 A1 | 8/2021 | Koskela et al. |
| 2021/0258063 A1 | 8/2021 | Ottersten et al. |
| 2021/0282211 A1 | 9/2021 | Pezeshki |
| 2022/0225121 A1* | 7/2022 | Wanuga ................ H04L 5/0048 |
| 2022/0225151 A1* | 7/2022 | Zhang ................... H04W 24/10 |

FOREIGN PATENT DOCUMENTS

| | | | |
|---|---|---|---|
| WO | WO-2018063435 A2 * | 4/2018 | ............ H04L 47/34 |
| WO | 2019215381 A1 | 11/2019 | |
| WO | 2020098591 A1 | 5/2020 | |
| WO | WO-2020259832 A1 * | 12/2020 | |

OTHER PUBLICATIONS

International Preliminary Report on Patentability—PCT/US2021/070208, The International Bureau of WIPO—Geneva, Switzerland, Sep. 15, 2022.

International Search Report and Written Opinion—PCT/US2021/070208—ISA/EPO—Jun. 11, 2021.

QUALCOMM: "Beam Failure Recovery Procedure", 3GPP Draft, 3GPP TSG RAN WG2 #92b, R1-1804788_BFRPROCEDURE, 3rd Generation Partnership Project (3GPP), Mobile Competence Centre, 650, Route Des Lucioles, F-06921 Sophia-Antipolis Cedex, France, vol. RAN WG1, No. Sanya, China, 20180416-20180420, Apr. 15, 2018 Apr. 15, 2018), XP051427055, 10 Pages, 10 Pages, paragraph [03.2], p. 2-p. 3, p. 5-p. 7, the whole document.

* cited by examiner

SUSPENSION OF BEAM OR LINK RECOVERY FOR A FAILURE EVENT

CROSS-REFERENCE TO RELATED APPLICATIONS

This patent application is a continuation of U.S. patent application Ser. No. 17/249,394, filed Mar. 1, 2021, which claims priority to U.S. Provisional Patent Application No. 62/985,830, filed on Mar. 5, 2020, both entitled "SUSPENSION OF BEAM OR LINK RECOVERY FOR A FAILURE EVENT," and assigned to the assignee hereof. The disclosures of the prior applications are considered part of and are incorporated by reference in this patent application.

INTRODUCTION

Aspects of the present disclosure generally relate to wireless communication and to techniques and apparatuses for suspending beam or link recovery.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include determining that a failure event for a beam or a link, between the UE and a base station, is occurring or will occur. The method may include transmitting a message to the base station indicating that the UE is refraining from performing a recovery procedure for the beam or the link for a time duration.

In some aspects, a method of wireless communication performed by a base station may include receiving a message from a UE indicating that the UE has refrained or will refrain from performing a recovery procedure for a time duration after a failure event for a beam or a link. The method may include refraining from abandoning or reassigning the beam or the link for the time duration.

In some aspects, a method of wireless communication performed by UE may include determining that one or more failure events for a beam or a link, between the UE and a base station, have occurred. The method may include transmitting a message, to the base station, indicating information associated with the one or more failure events.

In some aspects, a method of wireless communication performed by a base station may include receiving a message from a UE indicating information associated with one or more failure events that occurred for a beam or a link between the UE and the base station. The method may include reconfiguring a recovery procedure for the UE based at least in part on the information associated with the one or more failure events.

In some aspects, a UE for wireless communication includes a memory and one or more processors coupled to the memory. The memory and the one or more processors may be configured to determine that a failure event for a beam or a link, between the UE and a base station, is occurring or will occur, and transmit a message to the base station indicating that the UE is refraining from performing a recovery procedure for the beam or the link for a time duration.

In some aspects, a base station for wireless communication includes a memory and one or more processors coupled to the memory. The memory and the one or more processors may be configured to receive a message from a UE indicating that the UE has refrained or will refrain from performing a recovery procedure for a time duration after a failure event for a beam or a link, and refrain from abandoning or reassigning the beam or the link for the time duration.

In some aspects, a UE for wireless communication includes a memory and one or more processors coupled to the memory. The memory and the one or more processors may be configured to determine that one or more failure events for a beam or a link, between the UE and a base station, have occurred, and transmit a message, to the base station, indicating information associated with the one or more failure events.

In some aspects, a base station for wireless communication includes a memory and one or more processors coupled to the memory. The memory and the one or more processors may be configured to receive a message from a UE indicating information associated with one or more failure events that occurred for a beam or a link between the UE and the base station, and reconfigure a recovery procedure for the UE based at least in part on the information associated with the one or more failure events.

In some aspects, a non-transitory computer-readable medium may store a set of instructions for wireless communication that includes one or more instructions that, when executed by one or more processors of a UE, cause the UE to determine that a failure event for a beam or a link, between the UE and a base station, is occurring or will occur, and transmit a message to the base station indicating that the UE is refraining from performing a recovery procedure for the beam or the link for a time duration.

In some aspects, a non-transitory computer-readable medium may store a set of instructions for wireless communication that includes one or more instructions that, when executed by one or more processors of a base station, cause the base station to receive a message from a UE indicating that the UE has refrained or will refrain from performing a recovery procedure for a time duration after a failure event for a beam or a link, and refrain from abandoning or reassigning the beam or the link for the time duration.

In some aspects, a non-transitory computer-readable medium may store a set of instructions for wireless communication includes one or more instructions that, when executed by one or more processors of an UE, cause the UE to determine that one or more failure events for a beam or a link, between the UE and a base station, have occurred, and transmit a message, to the base station, indicating information associated with the one or more failure events.

In some aspects, a non-transitory computer-readable medium may store a set of instructions for wireless communication includes one or more instructions that, when executed by one or more processors of a base station, cause the base station to receive a message from a UE indicating information associated with one or more failure events that occurred for a beam or a link between the UE and the base station, and reconfigure a recovery procedure for the UE based at least in part on the information associated with the one or more failure events.

In some aspects, an apparatus for wireless communication may include means for determining that a failure event for a beam or a link, between the apparatus and a base station, is occurring or will occur, and means for transmitting a message to the base station indicating that the apparatus is refraining from performing a recovery procedure for the beam or the link for a time duration.

In some aspects, an apparatus for wireless communication may include means for receiving a message from a UE indicating that the UE has refrained or will refrain from performing a recovery procedure for a time duration after a failure event for a beam or a link, and means for refraining from abandoning or reassigning the beam or the link for the time duration.

In some aspects, an apparatus for wireless communication may include means for determining that one or more failure events for a beam or a link, between the apparatus and a base station, have occurred, and means for transmitting a message, to the base station, indicating information associated with the one or more failure events.

In some aspects, an apparatus for wireless communication may include means for receiving a message from a UE indicating information associated with one or more failure events that occurred for a beam or a link between the UE and the apparatus, and means for reconfiguring a recovery procedure for the UE based at least in part on the information associated with the one or more failure events.

In some aspects, a method of wireless communication, performed by a UE, may include determining that the UE is experiencing or is about to experience a failure event for a beam or a link, and transmitting a message to a base station indicating that the UE is refraining from performing a recovery procedure for the beam or the link for a time duration.

In some aspects, a method of wireless communication, performed by a base station, may include receiving a message from a UE indicating that the UE is refraining from performing a recovery procedure after a failure event for a beam or a link, and refraining from abandoning or reassigning the beam or the link.

In some aspects, a method of wireless communication, performed by a UE, may include determining that the UE experienced one or more failure events for a beam or a link, and transmitting a message to a base station indicating information associated with the one or more failure events.

In some aspects, a method of wireless communication, performed by a base station, may include receiving a message from a UE indicating information associated with one or more failure events experienced by the UE for a beam or a link, and reconfiguring a recovery procedure for the UE based at least in part on the information associated with the one or more failure events.

In some aspects, a UE for wireless communication may include a memory and one or more processors coupled to the memory. The memory and the one or more processors may be configured to determine that the UE is experiencing or is about to experience a failure event for a beam or a link, and transmit a message to a base station indicating that the UE is refraining from performing a recovery procedure for the beam or the link for a time duration.

In some aspects, a base station for wireless communication may include a memory and one or more processors coupled to the memory. The memory and the one or more processors may be configured to receive a message from a UE indicating that the UE is refraining from performing a recovery procedure after a failure event for a beam or a link, and refrain from abandoning or reassigning the beam or the link.

In some aspects, a UE for wireless communication may include a memory and one or more processors coupled to the memory. The memory and the one or more processors may be configured to determine that the UE experienced one or more failure events for a beam or a link, and transmit a message to a base station indicating information associated with the one or more failure events.

In some aspects, a base station for wireless communication may include a memory and one or more processors coupled to the memory. The memory and the one or more processors may be configured to receive a message from a UE indicating information associated with one or more failure events experienced by the UE for a beam or a link, and reconfigure a recovery procedure for the UE based at least in part on the information associated with the one or more failure events.

In some aspects, a non-transitory computer-readable medium may store one or more instructions for wireless communication. The one or more instructions, when executed by one or more processors of a UE, may cause the one or more processors to determine that the UE is experiencing or is about to experience a failure event for a beam or a link, and transmit a message to a base station indicating that the UE is refraining from performing a recovery procedure for the beam or the link for a time duration.

In some aspects, a non-transitory computer-readable medium may store one or more instructions for wireless communication. The one or more instructions, when executed by one or more processors of a base station, may cause the one or more processors to receive a message from a UE indicating that the UE is refraining from performing a recovery procedure after a failure event for a beam or a link, and refrain from abandoning or reassigning the beam or the link.

In some aspects, a non-transitory computer-readable medium may store one or more instructions for wireless communication. The one or more instructions, when executed by one or more processors of a UE, may cause the one or more processors to determine that the UE experienced one or more failure events for a beam or a link, and transmit a message to a base station indicating information associated with the one or more failure events.

In some aspects, a non-transitory computer-readable medium may store one or more instructions for wireless communication. The one or more instructions, when executed by one or more processors of a base station, may cause the one or more processors to receive a message from a UE indicating information associated with one or more failure events experienced by the UE for a beam or a link, and reconfigure a recovery procedure for the UE based at least in part on the information associated with the one or more failure events.

In some aspects, an apparatus for wireless communication may include means for determining that the apparatus is experiencing or is about to experience a failure event for a beam or a link, and means for transmitting a message to a base station indicating that the apparatus is refraining from performing a recovery procedure for the beam or the link for a time duration.

In some aspects, an apparatus for wireless communication may include means for receiving a message from a UE indicating that the UE is refraining from performing a recovery procedure after a failure event for a beam or a link, and means for refraining from abandoning or reassigning the beam or the link.

In some aspects, an apparatus for wireless communication may include means for determining that the apparatus experienced one or more failure events for a beam or a link, and means for transmitting a message to a base station indicating information associated with the one or more failure events.

In some aspects, an apparatus for wireless communication may include means for receiving a message from a UE indicating information associated with one or more failure events experienced by the UE for a beam or a link, and means for reconfiguring a recovery procedure for the UE based at least in part on the information associated with the one or more failure events.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
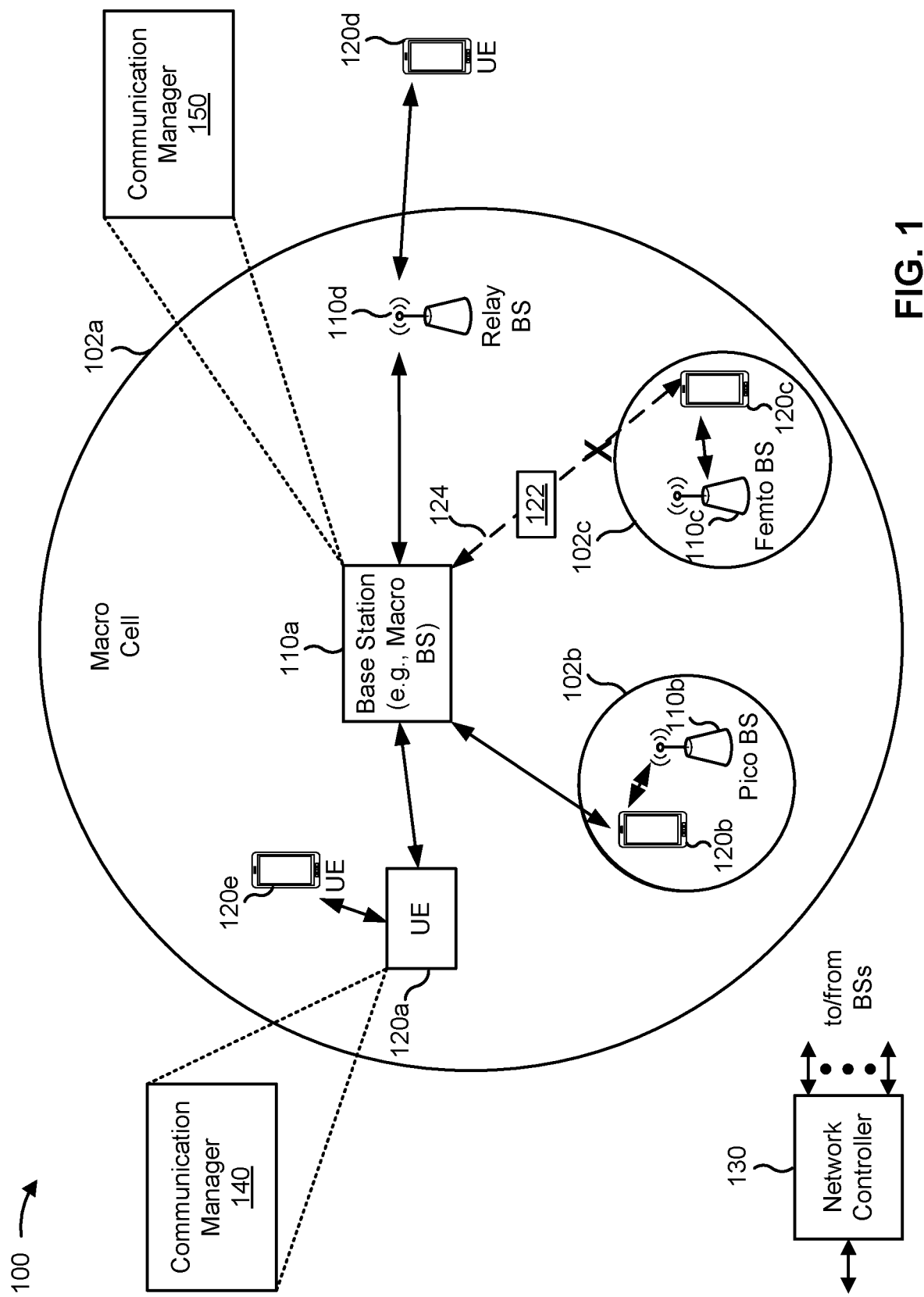
FIG. 1 is a diagram illustrating an example of a wireless communication network, in accordance with the present disclosure.

A user equipment (UE) may have a transmission beam blocked, for example, due to a building, a truck in a neighboring lane, or some other object causing a block event, which may be referred to more generally as a failure event. The failure event may be temporary. For example, the failure event may be temporary because the UE may be in a vehicle that will eventually pass by the truck. the UE may be able to wait out the failure event but, unfortunately, the failure event may have caused the UE to begin a recovery procedure, which may be a procedure to recover a link between the UE and a base station. That is, even though the truck has moved on, the recovery procedure may initiate a random access channel (RACH) procedure, which involves additional signaling. In one or more examples, the RACH procedure may not be successful at first due to the failure event, even though the failure event may end a certain time later (e.g., the large truck is no longer blocking the transmission beam). In other words, the RACH procedure may cause the UE to waste processing resources and signaling resources.

According to various aspects described herein, the UE may notify a base station that the UE will refrain, for a time duration, from following a beam failure recovery (BFR) procedure for the transmission beam (or a recovery procedure for a radio link). By suspending the recovery procedure, the UE may save processing and signaling resources by avoiding one or more unnecessary RACH procedures when circumstances causing a failure event may come to an end.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, and/or algorithms (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT) aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a BS 110d may communicate with macro BS 110a and a UE 120d in order to facilitate communication between BS 110a and UE 120d. A relay BS may also be referred to as a relay station, a relay base station, and/or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology or an air interface. A frequency may also be referred to as a carrier or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, UE 120 may perform scheduling operations, resource selection operations, and/or other operations described elsewhere herein as being performed by base station 110. In one example, there may be an object 122 blocking a radio link 124 (e.g., transmission beam) from UE 120c to BS 110a.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" (mmWave) band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

As shown in FIG. 1, UE 120 may include a communication manager 140. As described in more detail elsewhere herein, communication manager 140 may determine that UE 120 is experiencing or is about to experience a failure event for a beam or a link, or that a failure event for a beam or a link, between UE 120 and the base station, is occurring or will occur. UE 120 may experience the failure event by detecting the failure event (e.g., obtaining measurements, comparing measurements to a signal threshold or time threshold, receiving information associated with a failure event, or the like). Communication manager 140 may transmit a message to a base station indicating that UE 120 is refraining (e.g., has refrained and is continuing to refrain) from performing a recovery procedure for the beam or the link for a time duration. Communication manager 140 may determine that UE 120 experienced one or more failure events for a beam or a link, or that one or more failure events for a beam or a link, between UE 120 and a base station, have occurred. Communication manager 140 may transmit a message to a base station indicating information associated with the one or more failure events. Additionally, or alternatively, communication manager 140 may perform one or more other operations described herein.

In some aspects, base station 110 may include a communication manager 150. As described in more detail elsewhere herein, communication manager 150 may receive a message from a UE indicating that the UE is refraining (e.g., has refrained or will refrain) from performing a recovery procedure after a failure event for a beam or a link and refrain from abandoning or reassigning the beam or the link. Communication manager 150 may receive a message from a UE indicating information associated with one or more failure events experienced by the UE or that occurred for a beam or a link and reconfigure a recovery procedure for the UE based at least in part on the information associated with the one or more failure events. Additionally, or alternatively, communication manager 150 may perform one or more other operations described herein.

As indicated above, FIG. 1 is provided merely as an example. Other examples may differ from what is described with regard to FIG. 1.

Figure 2:
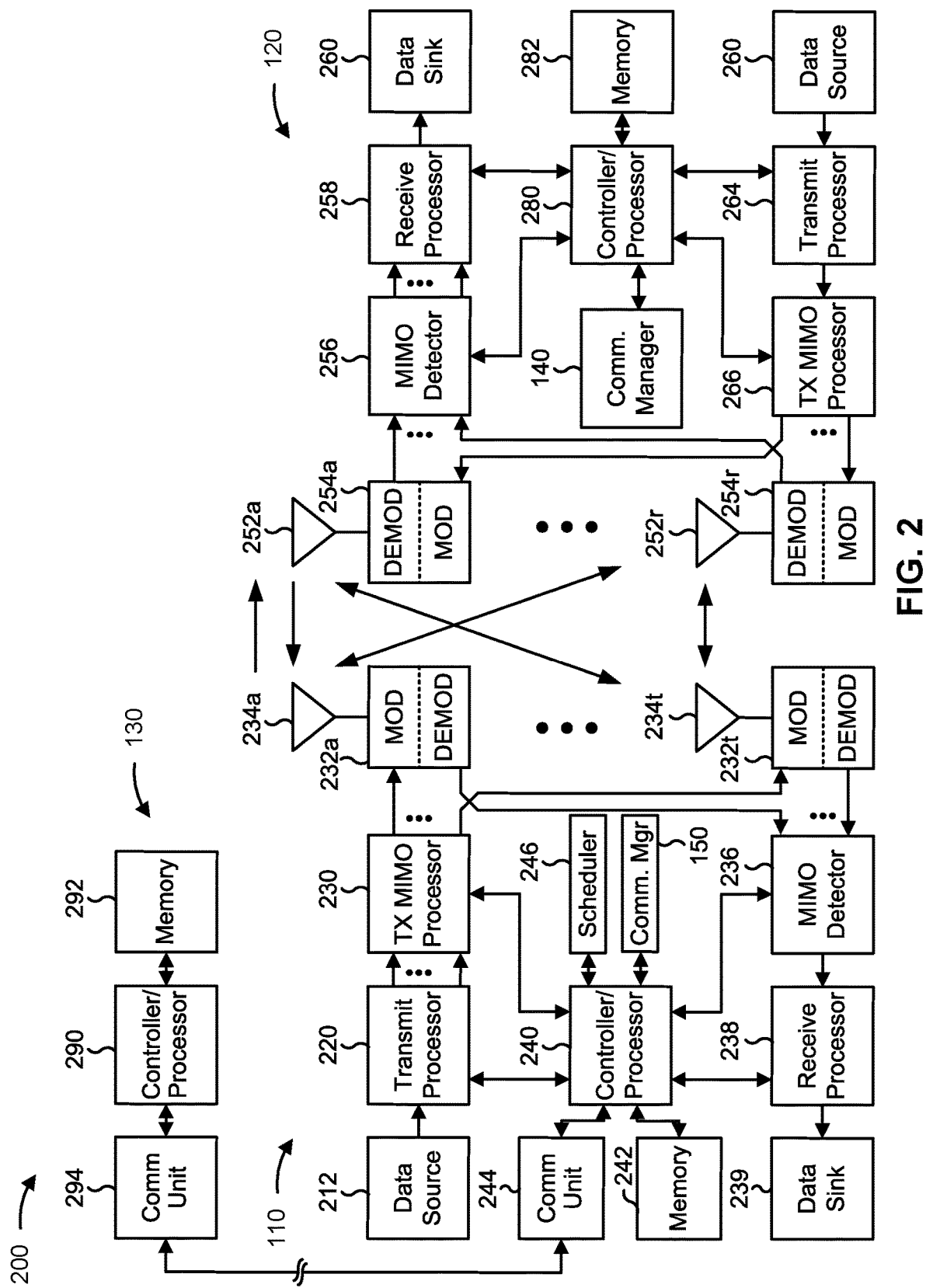
FIG. 2 is a diagram illustrating an example of a base station in communication with a user equipment (UE) in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of UE 120 may be included in a modem of UE 120. In some aspects, UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/ processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of base station 110 may be included in a modem of the base station 110. In some aspects, base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with suspension of a beam or a link recovery procedure for a failure event, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining that the UE is experiencing or is about to experience a failure event for a beam or a link, means for determining that a failure event for a beam or a link, between UE 120 and the base station, is occurring or will occur, and/or means for transmitting a message to a base station indicating that UE 120 is refraining from performing a recovery procedure for the beam or the link for a time duration. Additionally, or alternatively, UE 120 may include means for performing one or more other operations described herein. In some aspects, such means may include communication manager 140. Additionally, or alternatively, such means may include one or more components of the UE 120 described in connection with FIG. 2.

In some aspects, UE 120 may include means determining that UE 120 experienced one or more failure events for a beam or a link, means for determining that one or more failure events for a beam or a link, between UE 120 and a base station, have occurred, and/or means for transmitting a message to a base station indicating information associated with the one or more failure events. Additionally, or alternatively, UE 120 may include means for performing one or more other operations described herein. In some aspects, such means may include communication manager 140. Additionally, or alternatively, such means may include one or more components of the UE 120 described in connection with FIG. 2.

In some aspects, base station 110 may include means for receiving a message from a UE indicating that the UE is refraining (e.g., has refrained or will refrain) from performing a recovery procedure after a failure event for a beam or a link, and/or means for refraining from abandoning or reassigning the beam or the link. Additionally, or alternatively, base station 110 may include means for performing one or more other operations described herein. In some aspects, such means may include communication manager 150. In some aspects, such means may include one or more components of base station 110 described in connection with FIG. 2.

In some aspects, base station 110 may include means for receiving a message from a UE indicating information associated with one or more failure events experienced by the UE or that occurred for a beam or a link, and/or means for reconfiguring a recovery procedure for the UE based at least in part on the information associated with the one or more failure events. Additionally, or alternatively, base station 110 may include means for performing one or more other operations described herein. In some aspects, such means may include communication manager 150. In some aspects, such means may include one or more components of base station 110 described in connection with FIG. 2.

As indicated above, FIG. 2 is provided merely as an example. Other examples may differ from what is described with regard to FIG. 2.

A UE may lose a beam connection with a base station. A loss of the beam connection may be referred to as a beam failure instance, and the UE may receive an indication of a beam failure instance from a lower layer. The UE may start or restart a beam failure detection timer and increment a beam failure counter. The start of the beam failure detection timer may reset the beam failure counter or set the beam failure counter to start again at 1. If the beam failure counter reaches a maximum number of beam failure instances, the UE may determine that the UE is experiencing or is about to experience a failure event, or that a failure event for a beam or a link is occurring or will occur.

The failure event may be caused by a large object or a placement of an object in a path of the beam connection. The object may be a building, a natural structure, and/or a large vehicle (e.g., a large truck trailer in an adjacent lane). The failure event may also involve a human or part of a human as part of a maximum permissible exposure (MPE) limitation.

The failure event may cause the UE to perform a recovery procedure. The recovery procedure may include initiating a RACH procedure with the base station. The RACH procedure involves additional processing and signaling by the UE. The RACH procedure may not be successful right away due to the failure event, and thus the RACH procedure may be a waste of processing and signaling resources, especially if the failure event is temporary. For example, the UE may be in a vehicle that eventually passes by the building or passes the truck.

According to various aspects described herein, the UE may notify the base station that the UE will refrain from performing a recovery procedure, which the UE may normally be required to perform upon detecting a failure event. By not performing the recovery procedure, the UE may save processing and signaling resources that would be used for performing one or more unnecessary RACH procedures, when circumstances causing the failure event may disappear. While some aspects are described in the context of beam failure detection (BFD) and BFR, various aspects described herein are also applicable to radio link failure (RLF) in the context of radio link monitoring (RLM).

Figure 3A:
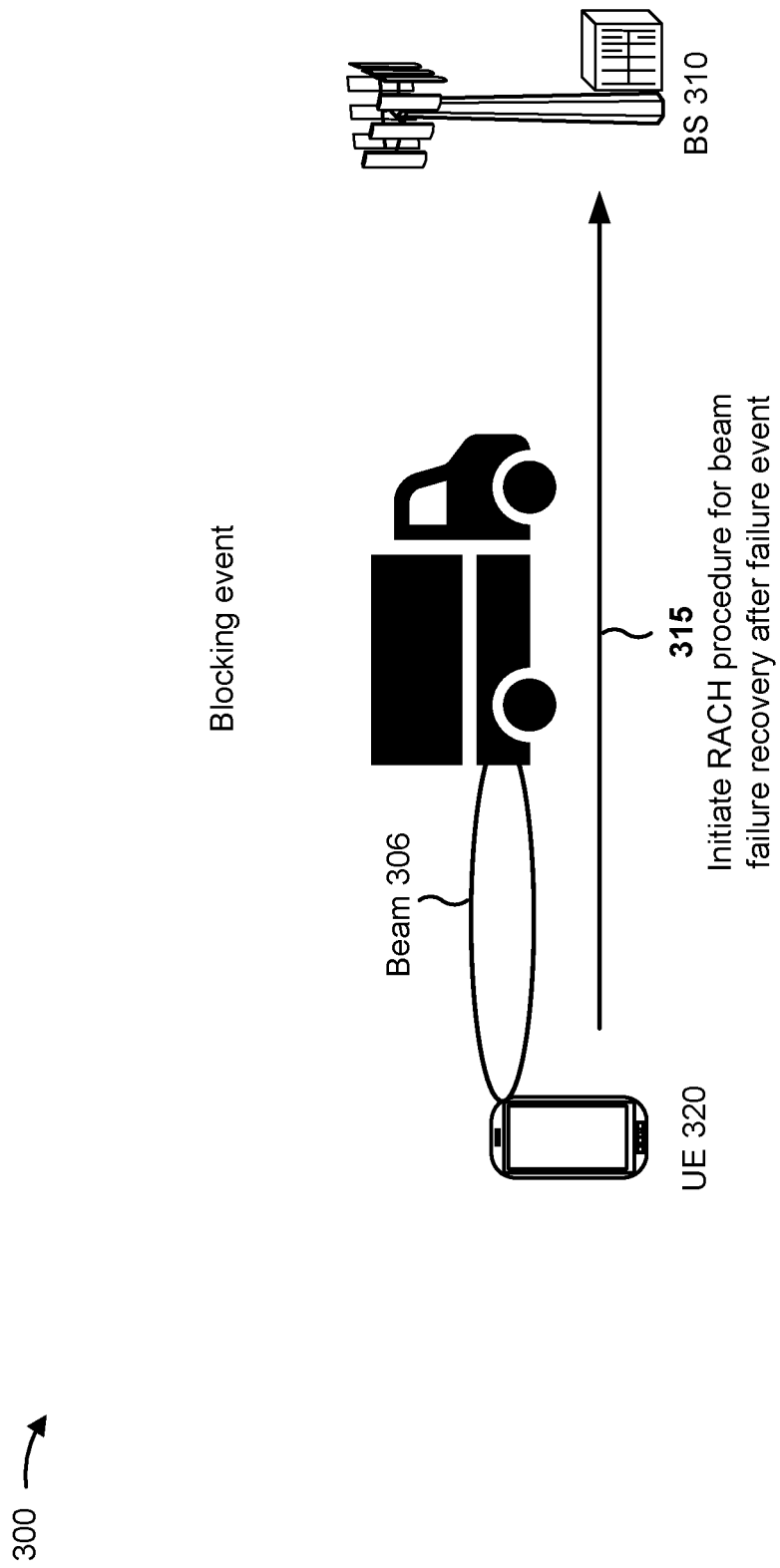
FIGS. 3A-3C are diagrams illustrating examples of failure events, in accordance with the present disclosure.
Figure 3B:
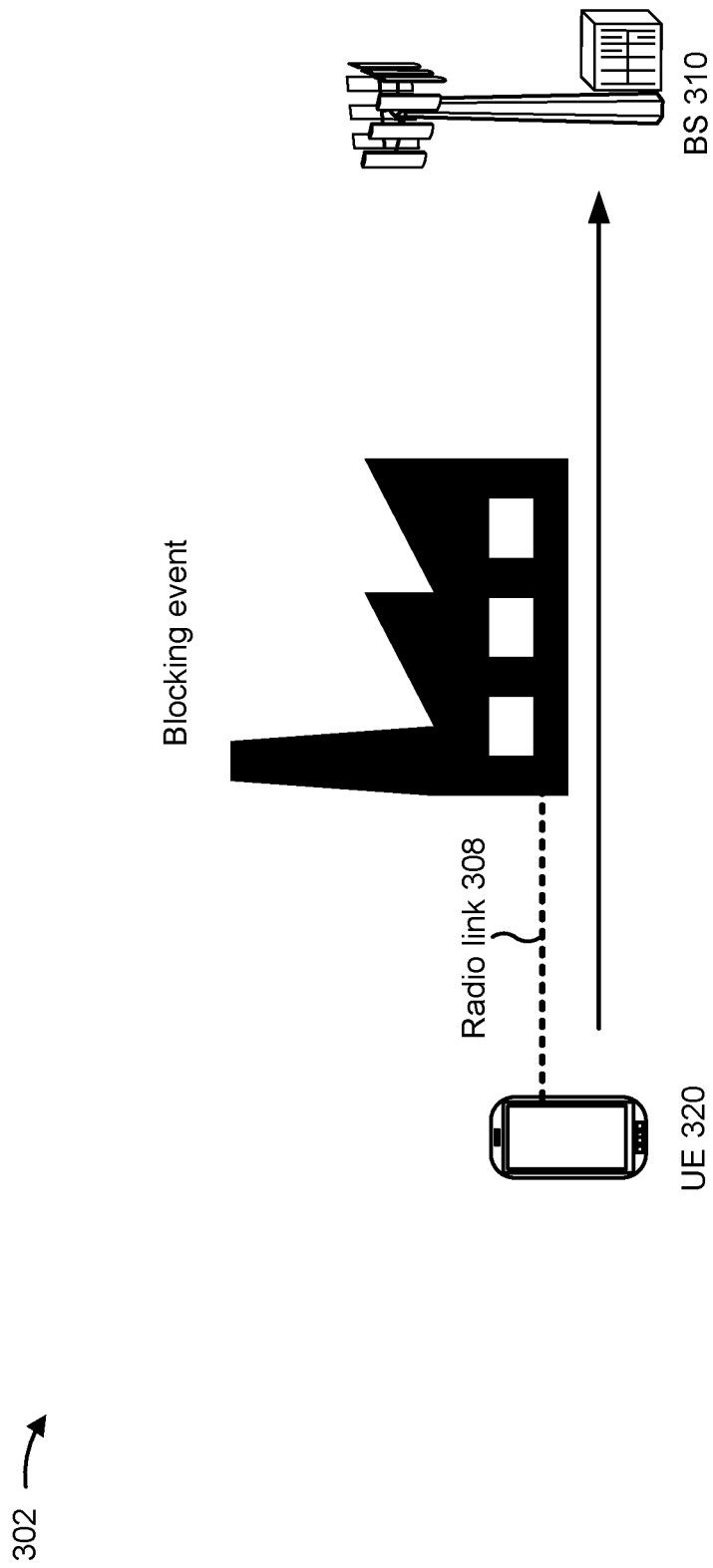
Figure 3C:
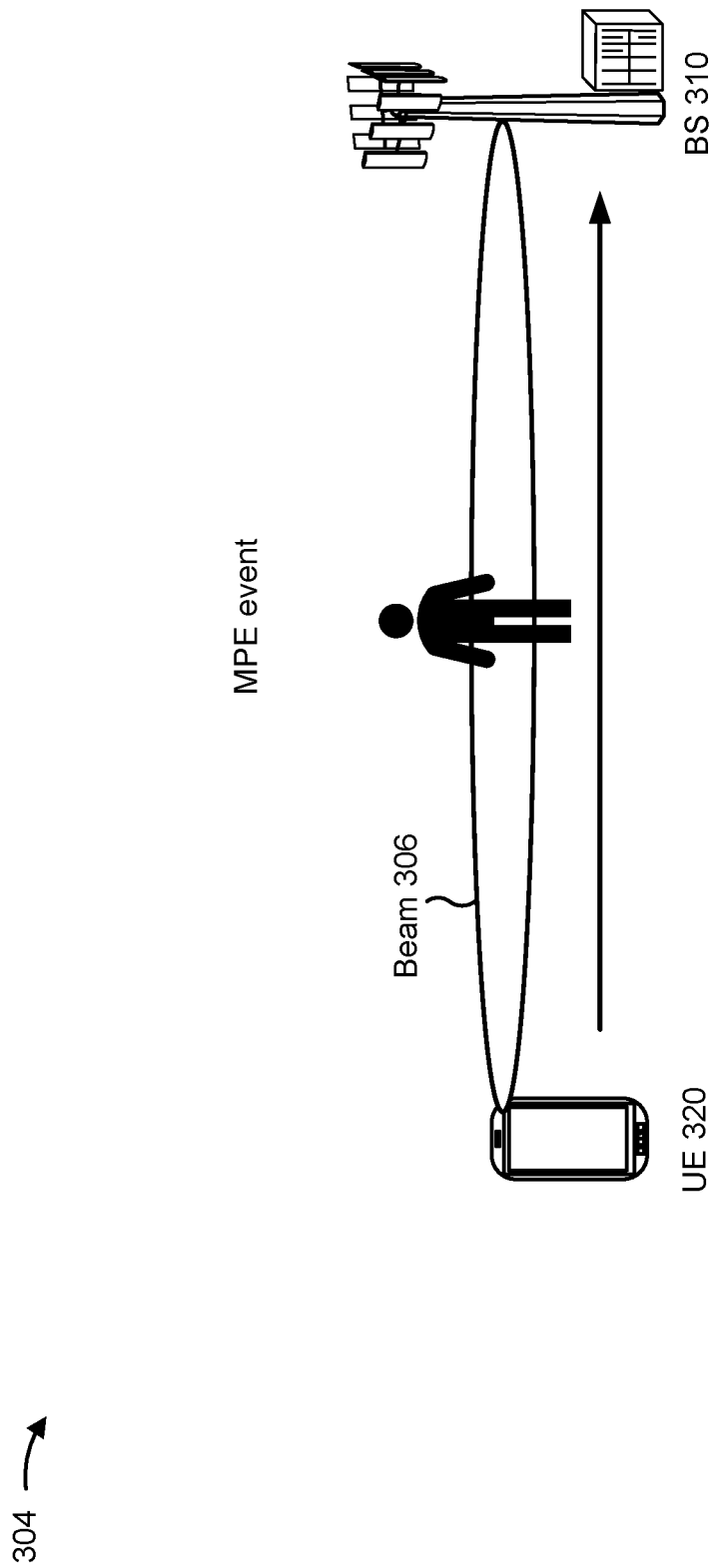

FIGS. 3A-3C are diagrams illustrating examples 300, 302, and 304 of failure events, in accordance with the present disclosure. FIGS. 3A-3C show BS 310 (e.g., BS 110 depicted in FIGS. 1 and 2) and a UE 320 (e.g., a UE 120 depicted in FIGS. 1 and 2) that may communicate with each other.

In example 300 of FIG. 3A, BS 310 and UE 320 may have established a connection via a beam 306 (or a radio link). However, UE 320 may detect a failure event caused by a large object in a beam path of the connection. The large object may be, for example, a large truck. The beam 306 may be blocked by the large truck.

As shown by reference number 315, UE 320 may perform a recovery procedure for the beam. For example, the recovery procedure may be a default recovery procedure. A default recovery procedure may be a procedure that UE 320 defaults to in order to recover a lost connection (e.g., beam, link). The recovery procedure may include a RACH procedure to reestablish the connection or to establish a new connection. UE 320 may perform the RACH procedure even though the truck may soon exit the path of the beam.

While examples are provided for a beam, the aspects described herein also apply to other links. Example 302 of FIG. 3B shows that the failure event may occur due to a building blocking a path of a radio link 308.

Example 304 of FIG. 3C shows that the failure event may occur due to an MPE event. For example, a human, or a body part of a human, may be in the path of the beam 306. UE 320 may operate with an MPE limitation that limits an amount of exposure to a human in the path of the beam 306. UE 320 may lower a transmit power of the beam 306 to satisfy the MPE limitation. Due to the lower transmit power, transmissions may not be successful and a failure event may occur.

Figure 3D:
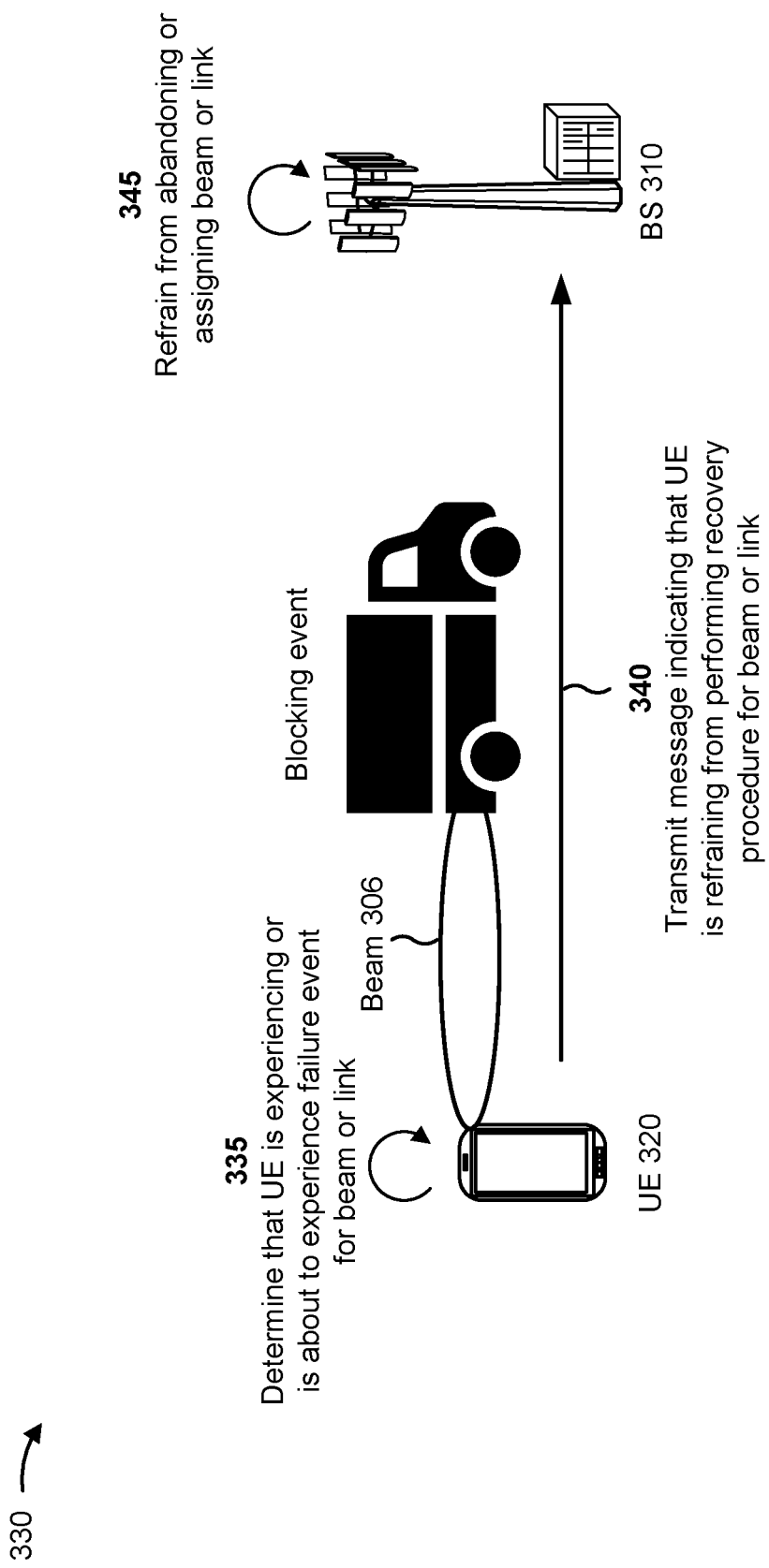
FIG. 3D is a diagram illustrating an example of suspending a beam or a link recovery procedure, in accordance with the present disclosure.

FIG. 3D is a diagram illustrating an example 330 of suspending a beam or a link recovery procedure, in accordance with the present disclosure. FIG. 3D shows the large truck of FIG. 3A blocking the beam 306 from UE 320 to BS 310.

BS 310 and UE 320 may have established the connection via the beam 306. However, as shown by reference number 335, UE 320 may determine, based at least in part on a number of beam failure instances during a beam failure timer, that UE 320 is experiencing or is about to experience a failure event, or that a failure event is about to occur.

As shown by reference number 340, UE 320 may transmit a message (e.g., a radio resource control (RRC) message, a medium access control control element (MAC-CE)) indicating that UE 320 will refrain from performing a recovery procedure for the beam 306 for a time duration. For example, UE 320 may refrain from performing the RACH procedure shown in FIG. 3A. UE 320 may suspend the recovery procedure or completely cancel the recovery procedure. In some aspects, UE 320 may modify parameters for the recovery procedure, based at least in part on a configuration from BS 310. For example, UE 320 may increase a maximum for a beam instance counter, increase a duration of a beam failure timer, and/or adjust a combination of the maximum and the duration.

In some aspects, UE 320 may transmit the message only for certain conditions. For example, UE 320 may transmit the message based at least in part on a determination that a failure event (or potential failure event) is of a certain type of failure event. UE 320 may have obtained information about types of failure events from stored configuration information and/or an RRC message. In some aspects, UE 320 may learn various types of failure events. For example, UE 320 may learn that a blocking duration of a passing truck trailer lasts for a certain amount of time and/or that there are certain characteristics of a failure event that may identify the failure event as a vehicle type of failure event rather than a building type of failure event. UE 320 may determine the type of failure event based at least in part on a number, a spacing, or a speed of beam failure instances during a certain duration of time. UE 320 may use other sensors or signaling feedback (e.g., signal strength, signal variance, signal reflection) to determine a type of failure event.

In some aspects, UE 320 may dynamically signal (e.g., physical uplink control channel message) to BS 310 that UE 320 will suspend a recovery procedure. For example, UE 320 may transmit the message for each failure event that is occurring or about to occur. In some aspects, UE 320 may signal (e.g., a RRC, a MAC-CE) to BS 310 that UE 320 may suspend a recovery procedure if a long blockage event arises in the future. For example, if UE 320 determines that the blockage event is not going to last long or if UE 320 determines, based at least in part on measurements of the candidate beams that UE 320 is constantly measuring for BFR purposes, that there is a more powerful alternative beam or beams to substitute for the current serving beam 306, then UE 320 can follow conventional BFR or RLF recovery procedures. If UE 320 determines that the blockage event is going to be longer than a threshold duration and there are no proper candidate beams with good reception to switch to, then UE 320 may decide to refrain from performing a conventional recovery procedure for a time duration.

In some aspects, UE 320 may transmit the message to the base station based at least in part on a determination that UE 320 will satisfy a threshold probability of maintaining the beam 306. The determination may be based at least in part on an internal state of an algorithm for finding another beam or another link. For example, UE 320 may transmit the message when UE 320 determines (or has a reasonable confidence) that the beam 306 will survive a failure event that would normally have triggered BFD/RLF. UE 320 may have an advanced search algorithm (e.g., neural network based), and the confidence may be based at least in part on the internal state of that algorithm (e.g., UE 320 just received some new data and/or is on the verge of generating a new suggested receive beam).

As shown by reference number 345, BS 310 may refrain from abandoning or reassigning the beam 306 for a time duration, based at least in part on receiving the message. For example, BS 310 may have normally dropped the connection over the beam following a loss of signal, so that the beam 306 may be reassigned to another connection. Instead, BS 310 may determine to wait out the failure event and continue the same connection later, without going through a RACH procedure during the time duration. Note that while the RACH procedure may not be imminent, there may be a later RACH procedure as necessary for another connection. BS 310 may also refrain from transmitting data to UE 320 during the time duration, especially if BS 310 does not receive an acknowledgement or negative acknowledgement from UE 320. BS 310 may resume transmission of data if UE 320 recovers, or if BS receives a RACH message from UE 320. As a result of the operations described above, BS 310 and UE 320 may save processing and signaling resources by avoiding one or more RACH procedures that may be unnecessary.

As indicated above, FIGS. 3A-3D provide some examples. Other examples may differ from what is described with regard to FIGS. 3A-3D.

Figure 4:
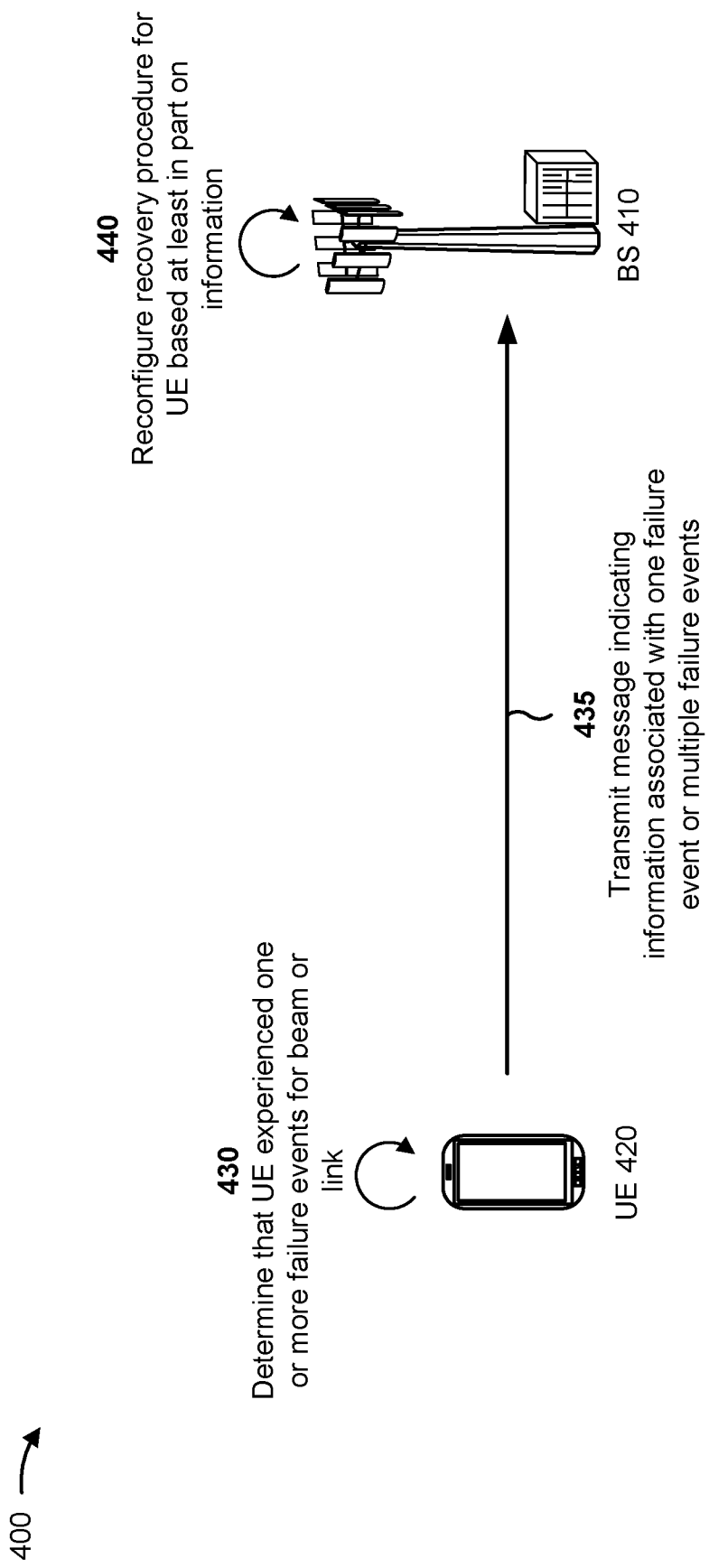
FIG. 4 is a diagram illustrating an example of suspending a beam or a link recovery procedure, in accordance with the present disclosure.

FIG. 4 is a diagram illustrating an example 400 of suspending a beam or a link recovery procedure, in accordance with the present disclosure. FIG. 4 shows a BS 410 (e.g., BS 110 depicted in FIGS. 1 and 2, BS 310 depicted in FIG. 3) and a UE 420 (e.g., a UE 120 depicted in FIGS. 1 and 2, UE 320 depicted in FIG. 3) that may communicate with each other.

BS 410 and UE 420 may establish a connection via a beam or a link. As shown by reference number 430, UE 420 may determine that UE 420 experienced one or more failure events. UE 420 may collect information (e.g., block duration, number of failed instances for the block duration) for a failure event or statistics for multiple failure events.

As shown by reference number 435, UE 420 may transmit a message with the information. In some aspects, UE 420 may transmit the message after each failure event. Alternatively, or additionally, UE 420 may transmit the message after multiple failure events.

As shown by reference number 440, BS 410 may reconfigure a recovery procedure for UE 420 based at least in part on the information. For example, BS 410 may extend or shorten a duration of a beam failure detection timer, increase or decrease a maximum number of beam instances, and/or adjust a combination of the duration and the maximum. While some aspects are described in the context of BFD and BFR, various aspects described herein may also apply to RLF in the context of RLM. Whether for BFD or RLM, BS 410 and UE 420 may save processing and signaling resources by not performing more RACH procedures than may be necessary.

In some aspects, UE 420 may transmit the information to BS 410, and BS 410 may transmit a reconfiguration of a recovery procedure. UE 420 may modify parameters for the recovery procedure, based at least in part on the reconfiguration from BS 310. For example, UE 420 may increase a maximum for a beam instance counter, increase a duration of a beam failure timer, and/or adjust a combination of the maximum and the duration.

As indicated above, FIG. 4 is provided merely as an example. Other examples may differ from what is described with regard to FIG. 4.

Figure 5:
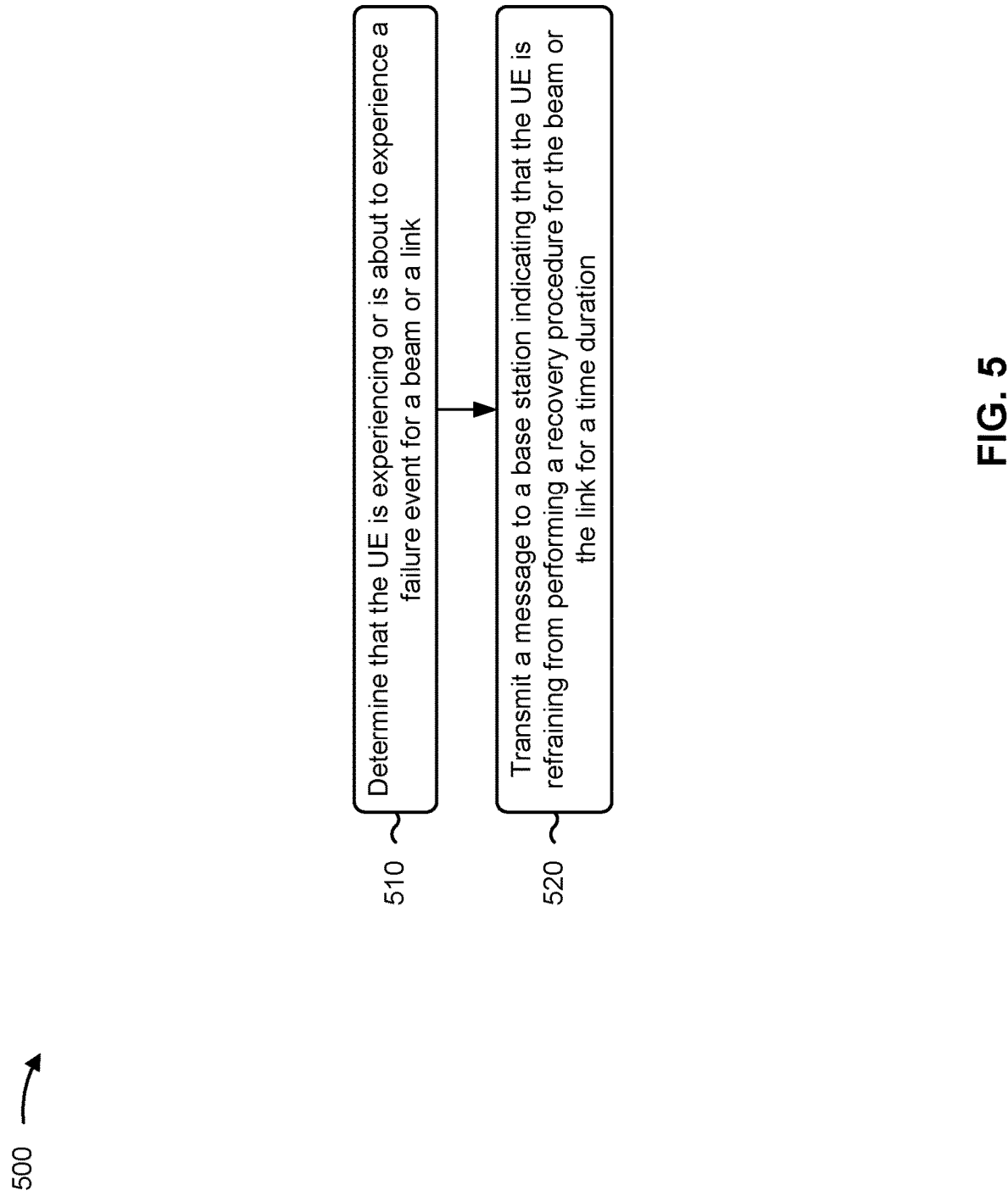
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., a UE 120 depicted in FIGS. 1 and 2, UE 320 depicted in FIG. 3, UE 420 depicted in FIG. 4) performs operations associated with suspension of beam or link recovery for a failure event.

As shown in FIG. 5, in some aspects, process 500 may include determining that the UE is experiencing or is about to experience a failure event for a beam or a link (block 510). For example, the UE (e.g., using receive processor 258, transmit processor 264, controller/processor 280, memory 282) may determine that the UE is experiencing or is about to experience a failure event for a beam or a link, as described above.

As further shown in FIG. 5, in some aspects, process 500 may include transmitting a message to the base station indicating that the UE is refraining from performing a recovery procedure for the beam or the link for a time duration (block 520). For example, the UE (e.g., using receive processor 258, transmit processor 264, controller/processor 280, memory 282) may transmit a message to the base station indicating that the UE is refraining from performing a recovery procedure for the beam or the link for a time duration, as described above.

Process 500 may include additional aspects, such as any single aspect or any combination of aspects described below and/or in connection with one or more other processes described elsewhere herein.

In a first aspect, the recovery procedure is a default recovery procedure.

In a second aspect, alone or in combination with the first aspect, the recovery procedure includes initiating a RACH procedure.

In a third aspect, alone or in combination with one or more of the first and second aspects, the time duration is based at least in part on a duration of one or more conditions causing the failure event.

In a fourth aspect, alone or in combination with one or more of the first through third aspects, process 500 includes canceling the recovery procedure.

In a fifth aspect, alone or in combination with one or more of the first through fourth aspects, process 500 includes modifying parameters for the recovery procedure.

In a sixth aspect, alone or in combination with one or more of the first through fifth aspects, the message is one of an RRC message, a MAC-CE, or a physical uplink control channel (PUCCH) message.

In a seventh aspect, alone or in combination with one or more of the first through sixth aspects, transmitting the message to the base station includes determining a type of the failure event based at least in part on information associated with the failure event and transmitting the message based at least in part on the type of the failure event.

In an eighth aspect, alone or in combination with one or more of the first through seventh aspects, the parameters include one or more of a duration of a beam failure detection timer, a duration of a link failure detection timer, a maximum for a beam failure indication counter, or a maximum for a link failure indication counter.

In a ninth aspect, alone or in combination with one or more of the first through eighth aspects, transmitting the message to the base station includes transmitting the message based at least in part on a determination that the UE will satisfy a threshold probability of maintaining the beam or the link based at least in part on an internal state of an algorithm for finding another beam or another link.

In a tenth aspect, alone or in combination with one or more of the first through ninth aspects, transmitting the message includes transmitting the message based at least in part on a determination that the UE is about to experience the failure event.

In an eleventh aspect, alone or in combination with one or more of the first through tenth aspects, the message indicates that the UE may refrain from performing the recovery procedure for the time duration for each of a plurality of failure events for the beam or the link.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
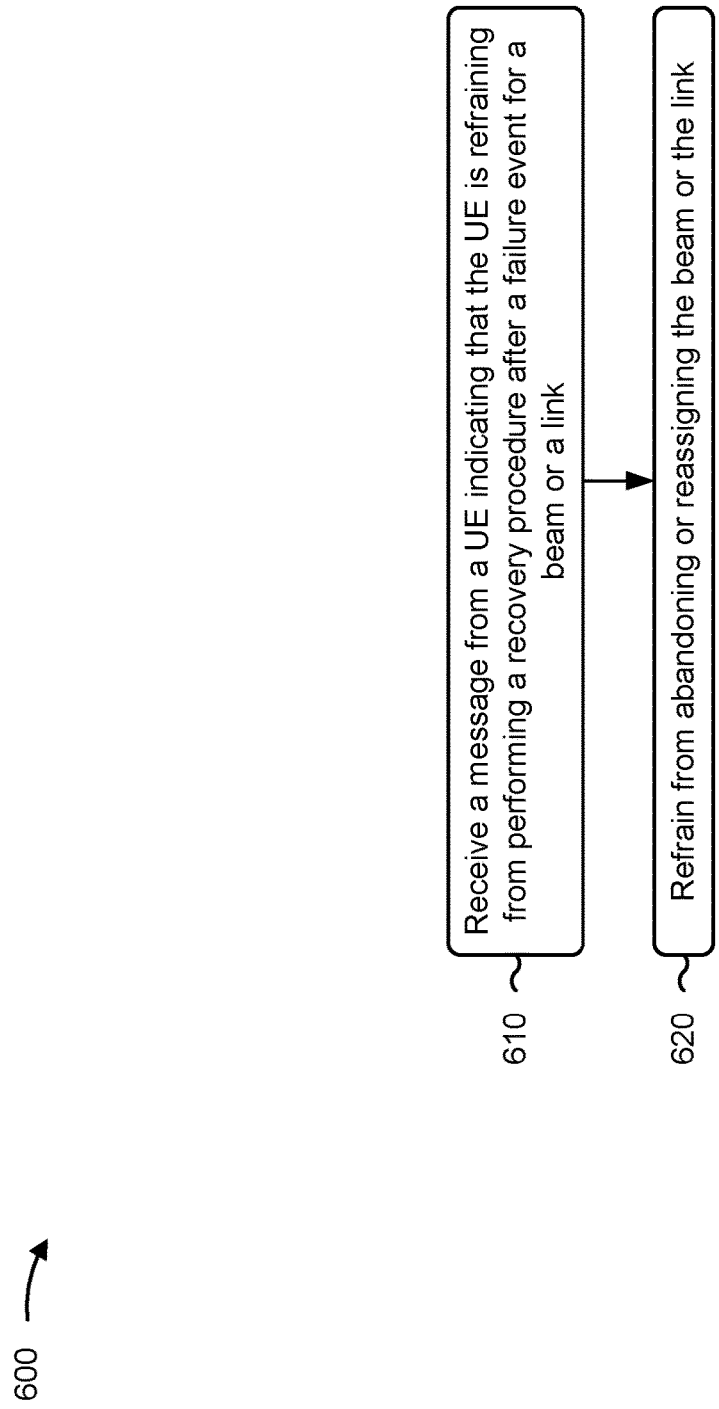
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., BS 110 depicted in FIGS. 1 and 2, BS 310 depicted in FIG. 3, BS 410 depicted in FIG. 4) performs operations associated with suspension of beam or link recovery for a failure event.

As shown in FIG. 6, in some aspects, process 600 may include receiving a message from a UE indicating that the UE is refraining (e.g., has refrained or will refrain) from performing a recovery procedure after a failure event for a beam or a link (block 610). For example, the base station (e.g., using transmit processor 220, receive processor 238, controller/processor 240, memory 242) may receive a message from a UE indicating that the UE is refraining (e.g., has refrained or will refrain) from performing a recovery procedure after a failure event for a beam or a link, as described above.

As further shown in FIG. 6, in some aspects, process 600 may include refraining from abandoning or reassigning the beam or the link (block 620). For example, the base station (e.g., using transmit processor 220, receive processor 238, controller/processor 240, memory 242) may refrain from abandoning or reassigning the beam or the link, as described above.

Process 600 may include additional aspects, such as any single aspect or any combination of aspects described below and/or in connection with one or more other processes described elsewhere herein.

In a first aspect, the recovery procedure is a default procedure.

In a second aspect, alone or in combination with the first aspect, the recovery procedure includes initiating a RACH procedure.

In a third aspect, alone or in combination with one or more of the first and second aspects, the message is one of an RRC message, a MAC-CE, or a PUCCH message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
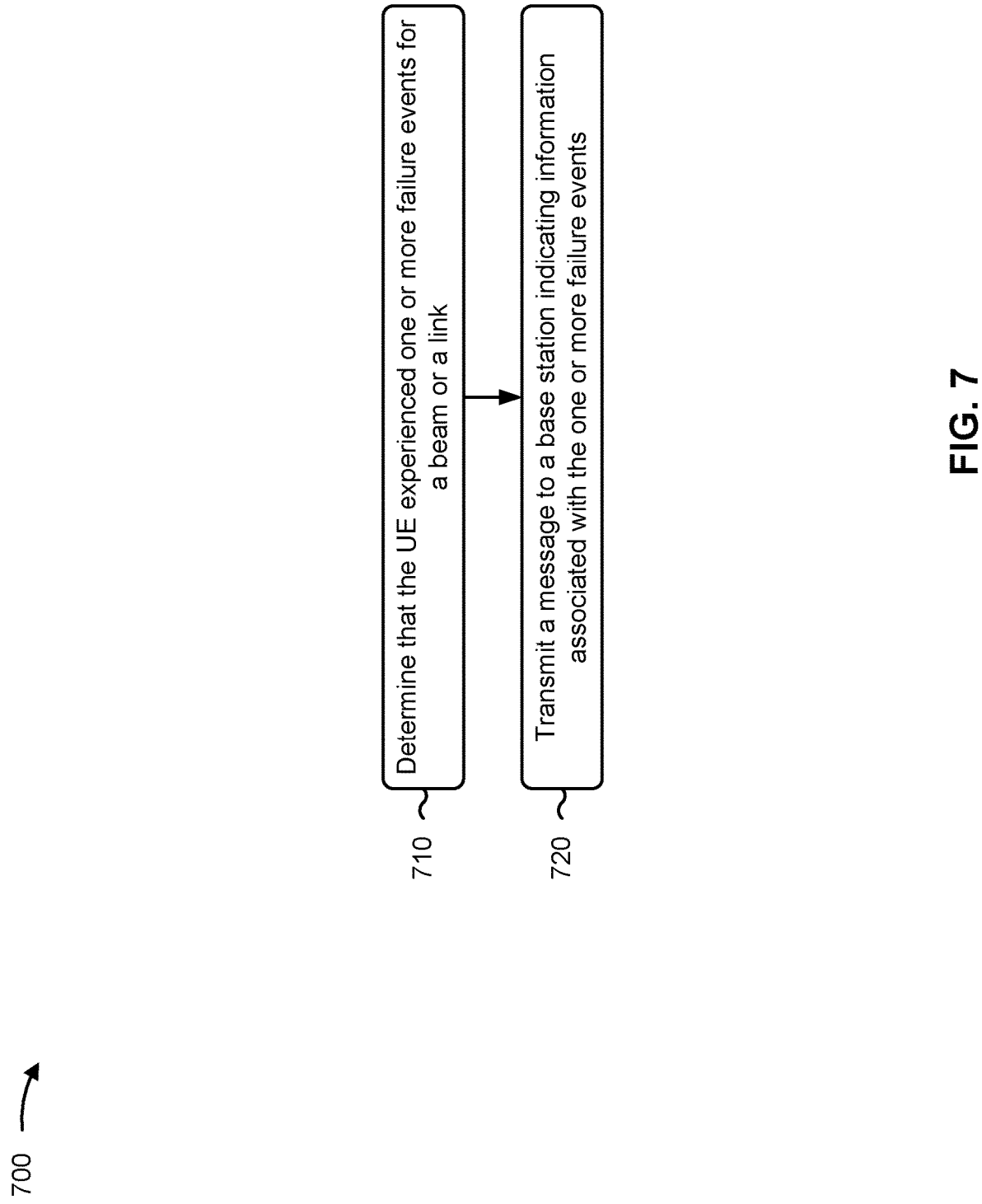
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., a UE 120 depicted in FIGS. 1 and 2, UE 320 depicted in FIG. 3, UE 420 depicted in FIG. 4) performs operations associated with suspension of beam or link recovery for a failure event.

As shown in FIG. 7, in some aspects, process 700 may include determining that the UE experienced one or more failure events for a beam or link (block 710). For example, the UE (e.g., using receive processor 258, transmit processor 264, controller/processor 280, memory 282) may determine that the UE experienced one or more failure events for a beam or a link, as described above.

As further shown in FIG. 7, in some aspects, process 700 may include transmitting a message to a base station indicating information associated with the one or more failure events (block 720). For example, the UE (e.g., using receive processor 258, transmit processor 264, controller/processor 280, memory 282) may transmit a message to a base station indicating information associated with the one or more failure events, as described above.

Process 700 may include additional aspects, such as any single aspect or any combination of aspects described below and/or in connection with one or more other processes described elsewhere herein.

In a first aspect, the one or more failure events is a single failure event and the information includes a failure duration for the single failure event.

In a second aspect, alone or in combination with the first aspect, the one or more failure events includes a plurality of failure events and the information is failure statistics for the plurality of failure events.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
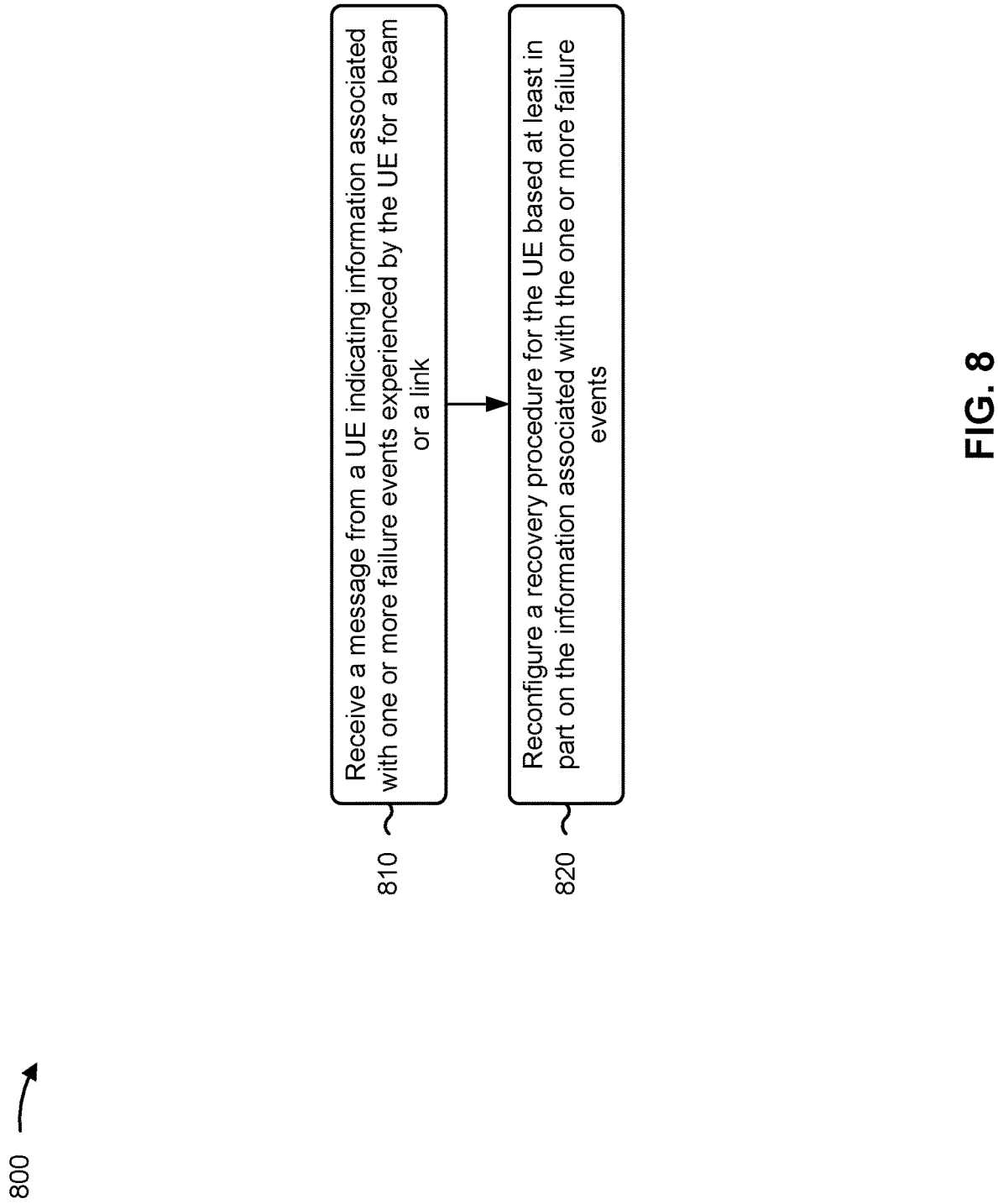
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., BS 110 depicted in FIGS. 1 and 2, BS 310 depicted in FIG. 3, BS 410 depicted in FIG. 4) performs operations associated with suspension of beam or link recovery for a failure event.

As shown in FIG. 8, in some aspects, process 800 may include receiving a message from a UE indicating information associated with one or more failure events experienced by the UE (block 810). For example, the base station (e.g., using transmit processor 220, receive processor 238, controller/processor 240, memory 242) may receive a message from a UE indicating information associated with one or more failure events experienced by the UE, as described above.

As further shown in FIG. 8, in some aspects, process 800 may include reconfiguring a recovery procedure for the UE based at least in part on the information associated with the one or more failure events (block 820). For example, the base station (e.g., using transmit processor 220, receive processor 238, controller/processor 240, memory 242) may reconfigure a recovery procedure for the UE based at least in part on the information associated with the one or more failure events, as described above.

Process 800 may include additional aspects, such as any single aspect or any combination of aspects described below and/or in connection with one or more other processes described elsewhere herein.

In a first aspect, reconfiguring the recovery procedure includes updating one or more of a failure timer, a failure instance maximum count for the UE, or a combination of the failure timer and the failure instance maximum count.

In a second aspect, alone or in combination with the first aspect, the one or more failure events includes a single failure event and the information is a failure duration for the single failure event.

In a third aspect, alone or in combination with one or more of the first and second aspects, the one or more failure events includes a plurality of failure events and the information is failure statistics for the plurality of failure events.

In a fourth aspect, alone or in combination with one or more of the first through third aspects, process 800 includes accelerating an RLF timer based at least in part on a beam failure indication.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
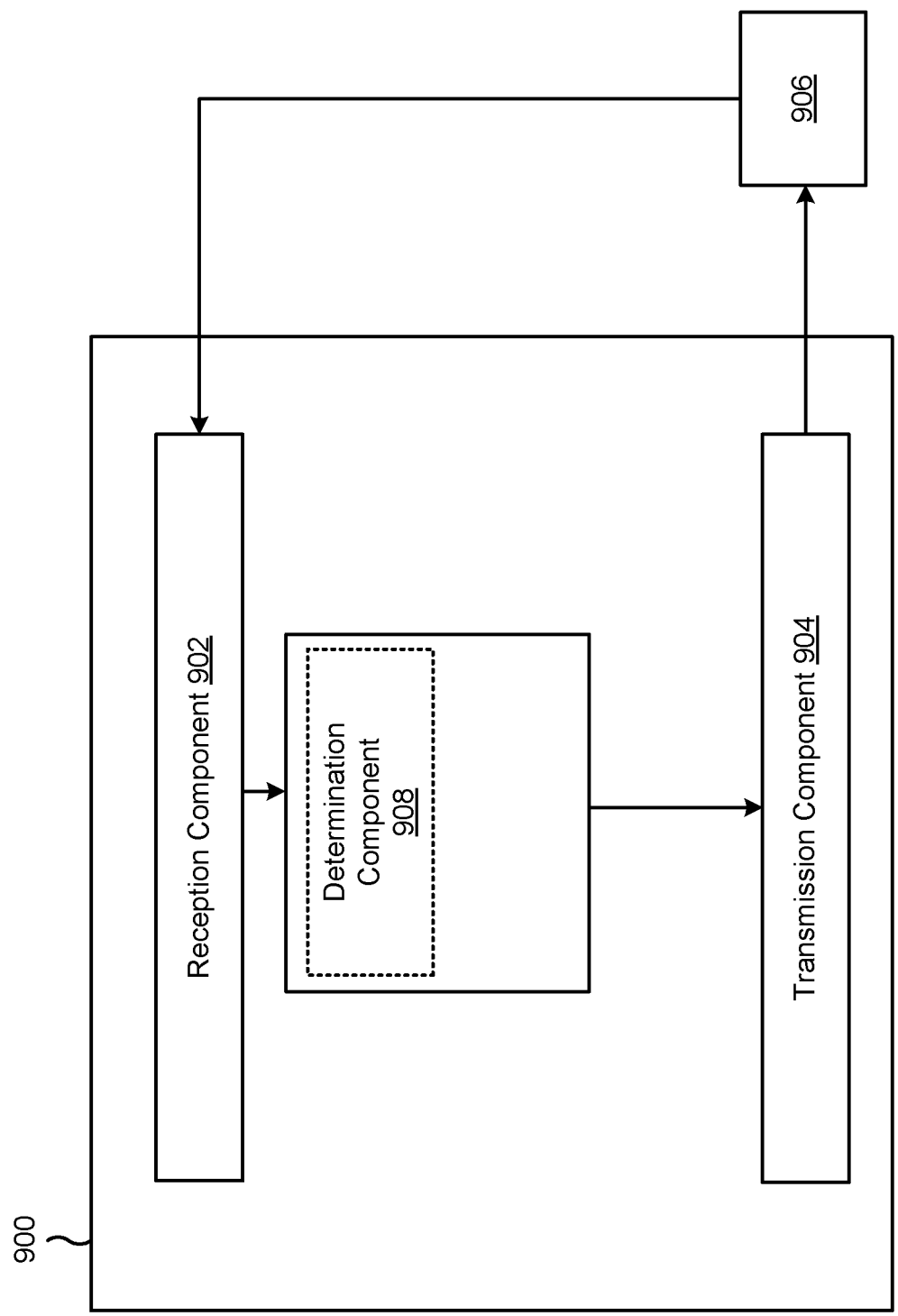
FIG. 9 is a block diagram of an example apparatus for wireless communication, in accordance with the present disclosure.

FIG. 9 is a block diagram of an example apparatus 900 for wireless communication. The apparatus 900 may be a UE, or a UE may include apparatus 900. In some aspects, apparatus 900 includes a reception component 902 and a transmission component 904, which may be in communication with one another (for example, via one or more buses and/or one or more other components). As shown, apparatus 900 may communicate with another apparatus 906 (such as a UE (e.g., UE 120e, among other examples), a base station (e.g., BS 110a, BS 110d, among other examples), or another wireless communication device) using reception component 902 and transmission component 904. As further shown, apparatus 900 may include a determination component 908, among other examples.

In some aspects, apparatus 900 may be configured to perform one or more operations described herein in connection with FIGS. 1-4. Additionally or alternatively, apparatus 900 may be configured to perform one or more processes described herein, such as process 500 of FIG. 5, process 700 of FIG. 7, or a combination thereof. In some aspects, apparatus 900 and/or one or more components shown in FIG. 9 may include one or more components of the network node described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

Reception component 902 may receive communications, such as reference signals, control information, data communications, or a combination thereof, from apparatus 906. Reception component 902 may provide received communications to one or more other components of apparatus 900. In some aspects, reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of apparatus 906. In some aspects, reception component 902 may include one or more antennas, a demodulator, a MIMO detector, a receive processor, a controller/processor, a memory, or a combination thereof, of the network node described above in connection with FIG. 2.

Transmission component 904 may transmit communications, such as reference signals, control information, data communications, or a combination thereof, to apparatus 906. In some aspects, one or more other components of apparatus 906 may generate communications and may provide the generated communications to transmission component 904 for transmission to apparatus 906. In some aspects, transmission component 904 may perform signal processing on the generated communications (such as filtering, amplification, modulation, digital-to-analog conversion, multiplexing, interleaving, mapping, or encoding, among other examples), and may transmit the processed signals to apparatus 906. In some aspects, transmission component 904 may include one or more antennas, a modulator, a transmit MIMO processor, a transmit processor, a controller/processor, a memory, or a combination thereof, of the network node described above in connection with FIG. 2. In some aspects, transmission component 904 may be co-located with reception component 902 in a transceiver.

Determination component 908 may determine that the UE is experiencing or is about to experience a failure event for a beam or a link, or that a failure event, between the UE and a base station, is about to occur. Transmission component 904 may transmit a message to the base station indicating that the UE is refraining from performing a recovery procedure for the beam or the link for a time duration.

Determination component 908 may determine that the UE experienced one or more failure events for a beam or a link, or that one or more failure events, between the UE and a base station, have occurred. Transmission component 904 may transmit a message to a base station indicating information associated with the one or more failure events.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
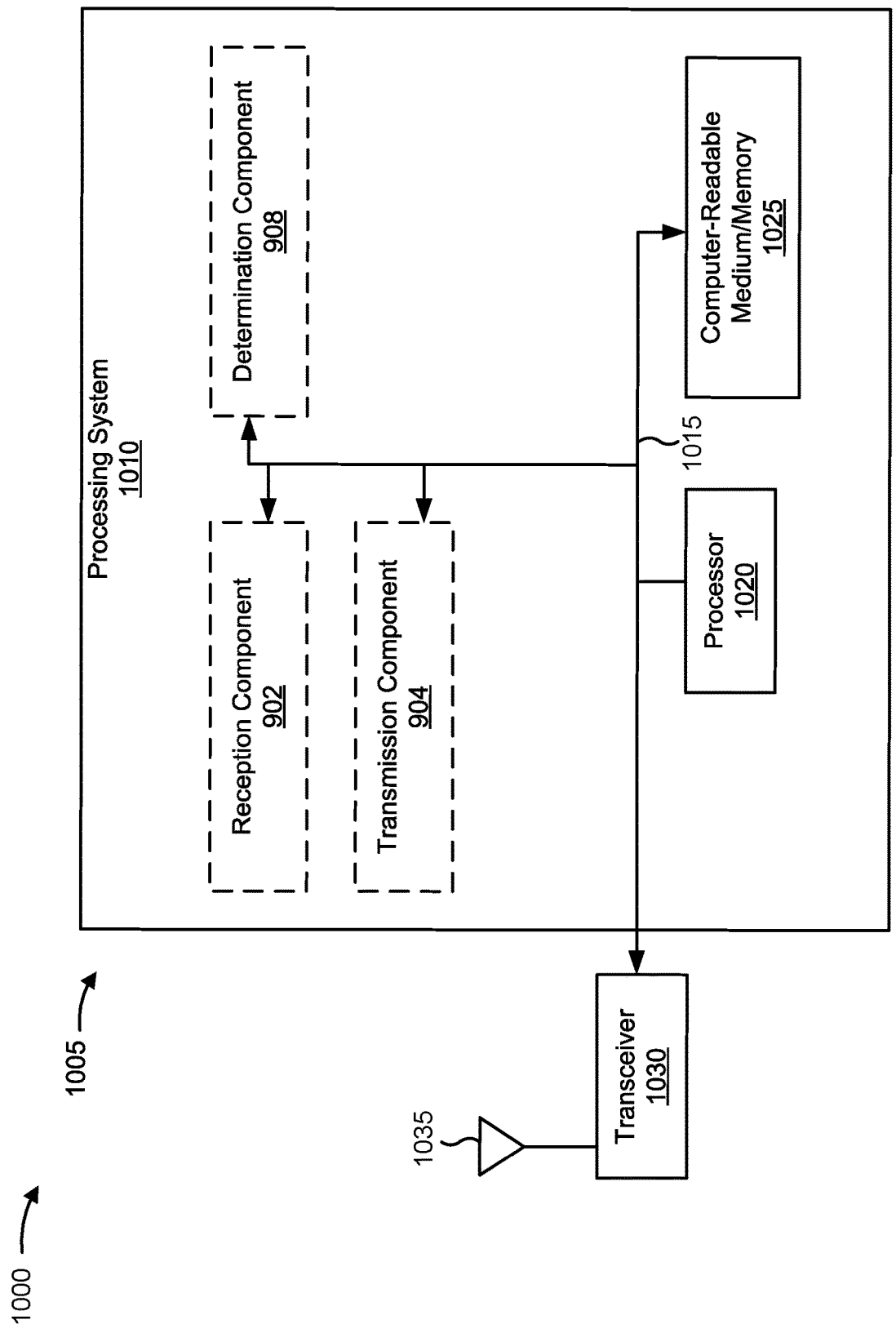
FIG. 10 is a diagram illustrating an example of a hardware implementation for an apparatus employing a processing system, in accordance with the present disclosure.

FIG. 10 is a diagram illustrating an example 1000 of a hardware implementation for an apparatus 1005 employing a processing system 1010. Apparatus 1005 may be a UE.

Processing system 1010 may be implemented with a bus architecture, represented generally by bus 1015. Bus 1015 may include any number of interconnecting buses and bridges depending on the specific application of processing system 1010 and the overall design constraints. Bus 1015 links together various circuits including one or more processors and/or hardware components, represented by processor 1020, the illustrated components, and computer-readable medium/memory 1025. Bus 1015 may also link various other circuits, such as timing sources, peripherals, voltage regulators, power management circuits, and/or the like.

Processing system 1010 may be coupled to a transceiver 1030. Transceiver 1030 is coupled to one or more antennas 1035. Transceiver 1030 provides a means for communicating with various other apparatuses over a transmission medium. Transceiver 1030 receives a signal from the one or more antennas 1035, extracts information from the received signal, and provides the extracted information to processing system 1010, specifically reception component 902. In addition, transceiver 1030 receives information from processing system 1010, specifically transmission component 904, and generates a signal to be applied to one or more antennas 1035 based at least in part on the received information.

Processing system 1010 includes a processor 1020 coupled to a computer-readable medium/memory 1025. Processor 1020 is responsible for general processing, including the execution of software stored on computer-readable medium/memory 1025. The software, when executed by processor 1020, causes processing system 1010 to perform the various functions described herein for any particular apparatus. Computer-readable medium/memory 1025 may also be used for storing data that is manipulated by processor 1020 when executing software. Processing system 1010 further includes at least one of the illustrated components. The components may be software modules running in processor 1020, resident/stored in computer readable medium/memory 1025, one or more hardware modules coupled to processor 1020, or some combination thereof.

In some aspects, processing system 1010 may be a component of base station 110 (e.g., BS 110*a*, BS 110*d*, among other examples) and may include the memory 242 and/or at least one of TX MIMO processor 230, RX processor 238, and/or controller/processor 240. In some aspects, processing system 1010 may be a component of UE 120 (e.g., UE 120*e* among other examples) and may include controller/processor 280, TX processor 264, TX MIMO processor 266, and/or RX processor 258. In some aspects, apparatus 1005 for wireless communication includes means for determining that the UE is experiencing or is about to experience a failure event for a beam or a link, means for determining that a failure event for a beam or a link, between the UE and the base station, is occurring or will occur, and/or means for transmitting a message to a base station indicating that the UE is refraining from performing a recovery procedure for the beam or the link for a time duration. In some aspects, apparatus 1005 may include means determining that the UE experienced one or more failure events for a beam or a link, means for determining that one or more failure events for a beam or a link, between the UE and a base station, have occurred, and/or means for transmitting a message to a base station indicating information associated with the one or more failure events. The aforementioned means may be one or more of the aforementioned components of apparatus 900 and/or the processing system 1010 of apparatus 1005 configured to perform the functions recited by the aforementioned means. As described elsewhere herein, processing system 1010 may include TX MIMO processor 230, receive processor 238, and/or controller/processor 240. In one configuration, the aforementioned means may be TX MIMO processor 230, receive processor 238, and/or the controller/processor 240 configured to perform the functions and/or operations recited herein.

FIG. 10 is provided as an example. Other examples may differ from what is described in connection with FIG. 10.

Figure 11:
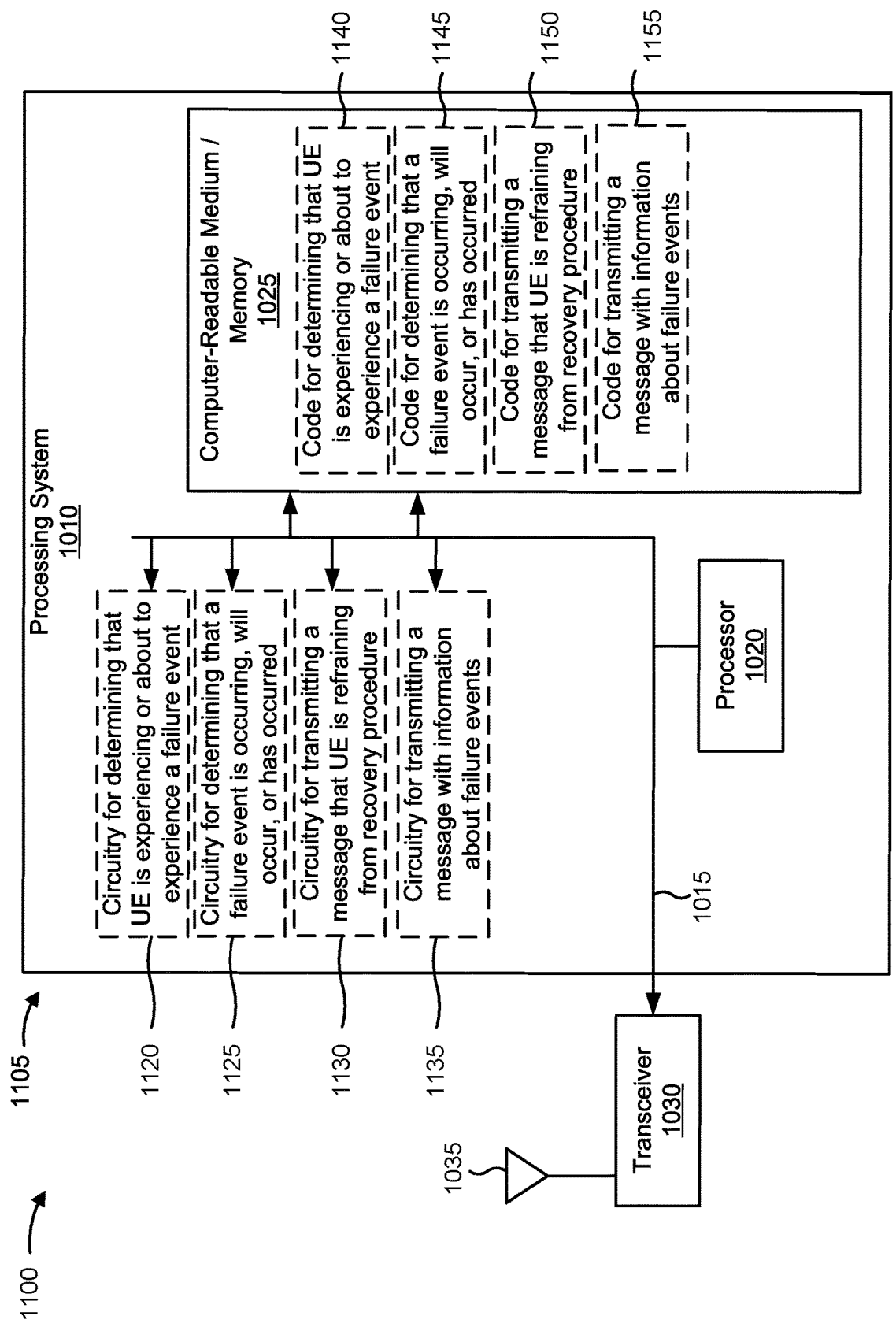
FIG. 11 is a diagram illustrating an example of an implementation of code and circuitry for an apparatus, in accordance with the present disclosure.

FIG. 11 is a diagram illustrating an example 1100 of an implementation of code and circuitry for an apparatus 1105. Apparatus 1105 may be a UE.

As further shown in FIG. 11, the apparatus may include circuitry for determining that the UE is experiencing or is about to experience a failure event for a beam or a link (circuitry 1120). For example, the apparatus may include circuitry to enable the apparatus to determine that the UE is experiencing or is about to experience a failure event for a beam or a link.

As further shown in FIG. 11, the apparatus may include circuitry for determining that a failure event for a beam or a link, between the UE and the base station, is occurring, will occur, or has occurred (circuitry 1125). For example, the apparatus may include circuitry to enable the apparatus to determine that a failure event for a beam or a link, between the UE and the base station, is occurring, will occur, or has occurred.

As further shown in FIG. 11, the apparatus may include circuitry for transmitting a message to a base station indicating that the UE is refraining from performing a recovery procedure for the beam or the link for a time duration (circuitry 1130). For example, the apparatus may include circuitry to enable the apparatus to transmit a message to a base station indicating that the UE is refraining from performing a recovery procedure for the beam or the link for a time duration.

As further shown in FIG. 11, the apparatus may include circuitry for transmitting a message to a base station indicating information associated with the one or more failure events (circuitry 1135). For example, the apparatus may include circuitry to enable the apparatus to transmit a message to a base station indicating information associated with the one or more failure events.

As further shown in FIG. 11, the apparatus may include, stored in computer-readable medium 1025, code for determining that the UE is experiencing or is about to experience a failure event for a beam or a link (code 1140). For example, the apparatus may include code that, when executed by processor 1020, may cause processor 1020 to determine that the UE is experiencing or is about to experience a failure event for a beam or a link.

As further shown in FIG. 11, the apparatus may include, stored in computer-readable medium 1025, code for determining that a failure event for a beam or a link, between the UE and the base station, is occurring, will occur, or has occurred (code 1145). For example, the apparatus may include code that, when executed by processor 1020, may cause processor 1020 to determine that a failure event for a beam or a link, between the UE and the base station, is occurring, will occur, or has occurred.

As further shown in FIG. 11, the apparatus may include, stored in computer-readable medium 1025, code for transmitting a message to a base station indicating that the UE is refraining from performing a recovery procedure for the beam or the link for a time duration (code 1150). For example, the apparatus may include code that, when executed by processor 1020, may cause processor 1020 to cause transceiver 1030 to transmit a message to a base station indicating that the UE is refraining from performing a recovery procedure for the beam or the link for a time duration.

As further shown in FIG. 11, the apparatus may include, stored in computer-readable medium 1025, code for transmitting a message to a base station indicating information associated with the one or more failure events (code 1155). For example, the apparatus may include code that, when executed by processor 1020, may cause processor 1020 to cause transceiver 1030 to transmit a message to a base station indicating information associated with the one or more failure events.

FIG. 11 is provided as an example. Other examples may differ from what is described in connection with FIG. 11.

Figure 12:
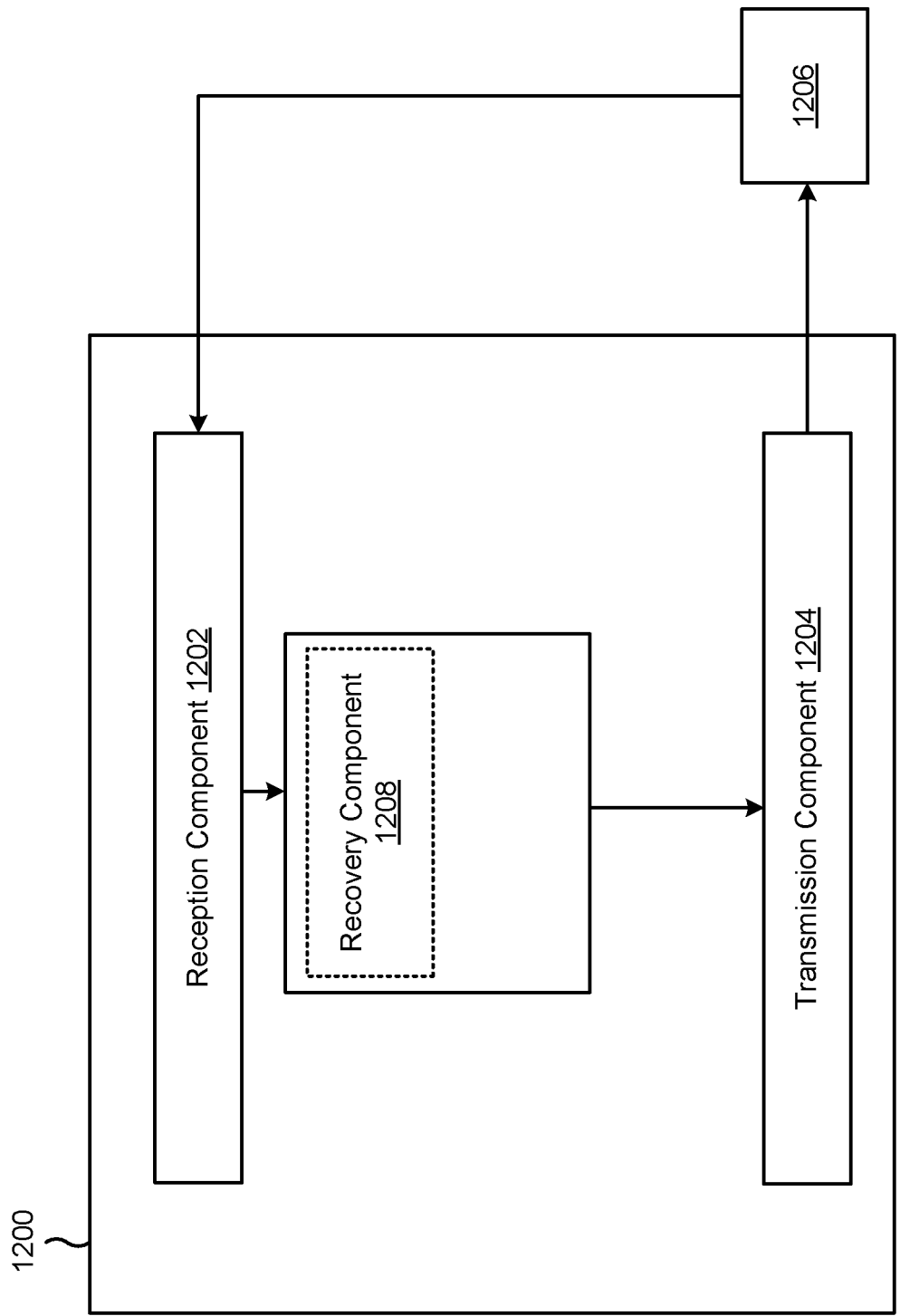
FIG. 12 is a block diagram of an example apparatus for wireless communication, in accordance with the present disclosure.

FIG. 12 is a block diagram of an example apparatus 1200 for wireless communication. The apparatus 1200 may be a base station, or a base station may include apparatus 1200. In some aspects, apparatus 1200 includes a reception component 1202 and a transmission component 1204, which may be in communication with one another (for example, via one or more buses and/or one or more other components). As shown, apparatus 1200 may communicate with another apparatus 1206 (such as a UE (e.g., UE 120e, among other examples), a base station (e.g., BS 110a, BS 110d, among other examples), or another wireless communication device) using reception component 1202 and transmission component 1204. As further shown, apparatus 1200 may include a recovery component 1208, among other examples.

In some aspects, apparatus 1200 may be configured to perform one or more operations described herein in connection with FIGS. 1-4. Additionally or alternatively, apparatus 1200 may be configured to perform one or more processes described herein, such as process 600 of FIG. 6, process 800 of FIG. 8, or a combination thereof. In some aspects, apparatus 1200 and/or one or more components shown in FIG. 12 may include one or more components of the network node described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

Reception component 1202 may receive communications, such as reference signals, control information, data communications, or a combination thereof, from apparatus 1206. Reception component 1202 may provide received communications to one or more other components of apparatus 1200. In some aspects, reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of apparatus 1206. In some aspects, reception component 1202 may include one or more antennas, a demodulator, a MIMO detector, a receive processor, a controller/processor, a memory, or a combination thereof, of the network node described above in connection with FIG. 2.

Transmission component 1204 may transmit communications, such as reference signals, control information, data communications, or a combination thereof, to apparatus 1206. In some aspects, one or more other components of apparatus 1206 may generate communications and may provide the generated communications to transmission component 1204 for transmission to apparatus 1206. In some aspects, transmission component 1204 may perform signal processing on the generated communications (such as filtering, amplification, modulation, digital-to-analog conversion, multiplexing, interleaving, mapping, or encoding, among other examples), and may transmit the processed signals to apparatus 1206. In some aspects, transmission component 1204 may include one or more antennas, a modulator, a transmit MIMO processor, a transmit processor, a controller/processor, a memory, or a combination thereof, of the network node described above in connection with FIG. 2. In some aspects, transmission component 1204 may be co-located with reception component 1202 in a transceiver.

Reception component 1202 may receive a message from a UE indicating that the UE is refraining (e.g., has refrained or will refrain) from performing a recovery procedure for a time duration after a failure event for a beam or a link. Recovery component 1208 may refrain from abandoning or reassigning the beam or the link for the time duration.

Reception component 1202 may receive a message from a UE indicating information associated with one or more failure events experienced by the UE or that occurred for a beam or a link between the UE and the base station. Recovery component 1208 may reconfigure a recovery procedure for the UE based at least in part on the information associated with the one or more failure events.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

Figure 13:
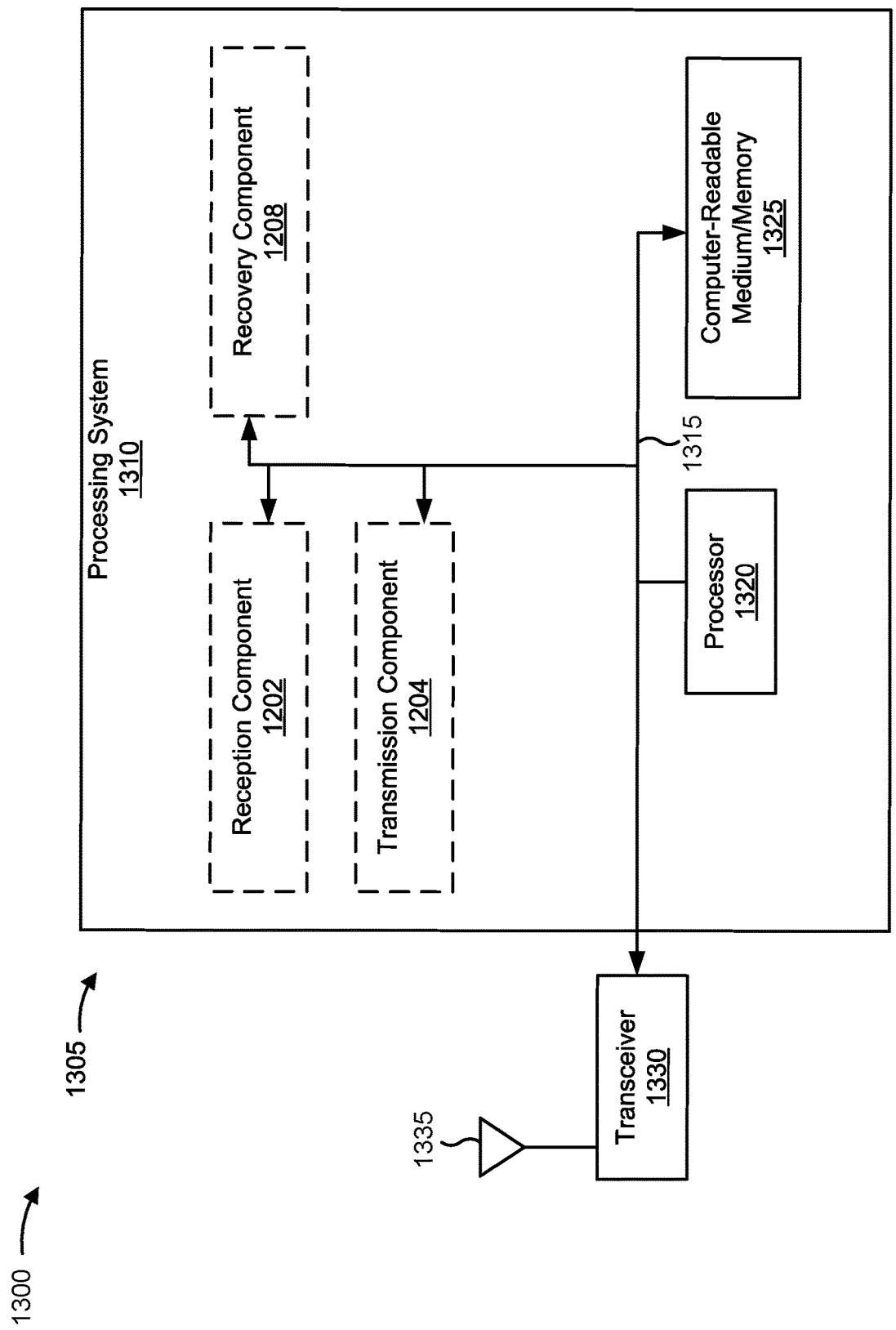
FIG. 13 is a diagram illustrating an example of a hardware implementation for an apparatus employing a processing system, in accordance with the present disclosure.

FIG. 13 is a diagram illustrating an example 1300 of a hardware implementation for an apparatus 1305 employing a processing system 1310. Apparatus 1305 may be a base station.

Processing system 1310 may be implemented with a bus architecture, represented generally by bus 1315. Bus 1315 may include any number of interconnecting buses and bridges depending on the specific application of processing system 1310 and the overall design constraints. Bus 1315 links together various circuits including one or more processors and/or hardware components, represented by processor 1320, the illustrated components, and computer-readable medium/memory 1325. Bus 1315 may also link various other circuits, such as timing sources, peripherals, voltage regulators, power management circuits, and/or the like.

Processing system 1310 may be coupled to a transceiver 1330. Transceiver 1330 is coupled to one or more antennas 1335. Transceiver 1330 provides a means for communicating with various other apparatuses over a transmission medium. Transceiver 1330 receives a signal from the one or more antennas 1335, extracts information from the received signal, and provides the extracted information to processing system 1310, specifically reception component 1202. In addition, transceiver 1330 receives information from processing system 1310, specifically transmission component 1204, and generates a signal to be applied to one or more antennas 1335 based at least in part on the received information.

Processing system 1310 includes a processor 1320 coupled to a computer-readable medium/memory 1325. Processor 1320 is responsible for general processing, including the execution of software stored on computer-readable medium/memory 1325. The software, when executed by processor 1320, causes processing system 1310 to perform the various functions described herein for any particular apparatus. Computer-readable medium/memory 1325 may also be used for storing data that is manipulated by processor 1320 when executing software. Processing system 1310 further includes at least one of the illustrated components. The components may be software modules running in processor 1320, resident/stored in computer readable medium/memory 1325, one or more hardware modules coupled to processor 1320, or some combination thereof.

In some aspects, processing system 1310 may be a component of base station 110 (e.g., BS 110a, BS 110d, among other examples) and may include the memory 242 and/or at least one of TX MIMO processor 230, RX processor 238, and/or controller/processor 240. In some aspects, processing system 1310 may be a component of UE 120 (e.g., UE 120e among other examples) and may include controller/processor 280, TX processor 264, TX MIMO processor 266, and/or RX processor 258. In some aspects, apparatus 1305 for wireless communication includes means for receiving a message from a UE indicating that the UE is refraining (e.g., has refrained or will refrain) from performing a recovery procedure for a time duration after a failure event for a beam or a link, and/or means for refraining from abandoning or reassigning the beam or the link for the time duration, among other examples. In some aspects, apparatus 1305 may include means for receiving a message from a UE indicating information associated with one or more failure events experienced by the UE or that occurred for a beam or a link between the UE and the base station, and/or means for reconfiguring a recovery procedure for the UE based at least in part on the information associated with the one or more failure events. The aforementioned means may be one or more of the aforementioned components of apparatus 1200 and/or the processing system 1310 of apparatus 1305 configured to perform the functions recited by the aforementioned means. As described elsewhere herein, processing system 1310 may include TX MIMO processor 230, receive processor 238, and/or controller/processor 240. In one configuration, the aforementioned means may be TX MIMO processor 230, receive processor 238, and/or the controller/processor 240 configured to perform the functions and/or operations recited herein.

FIG. 13 is provided as an example. Other examples may differ from what is described in connection with FIG. 13.

Figure 14:
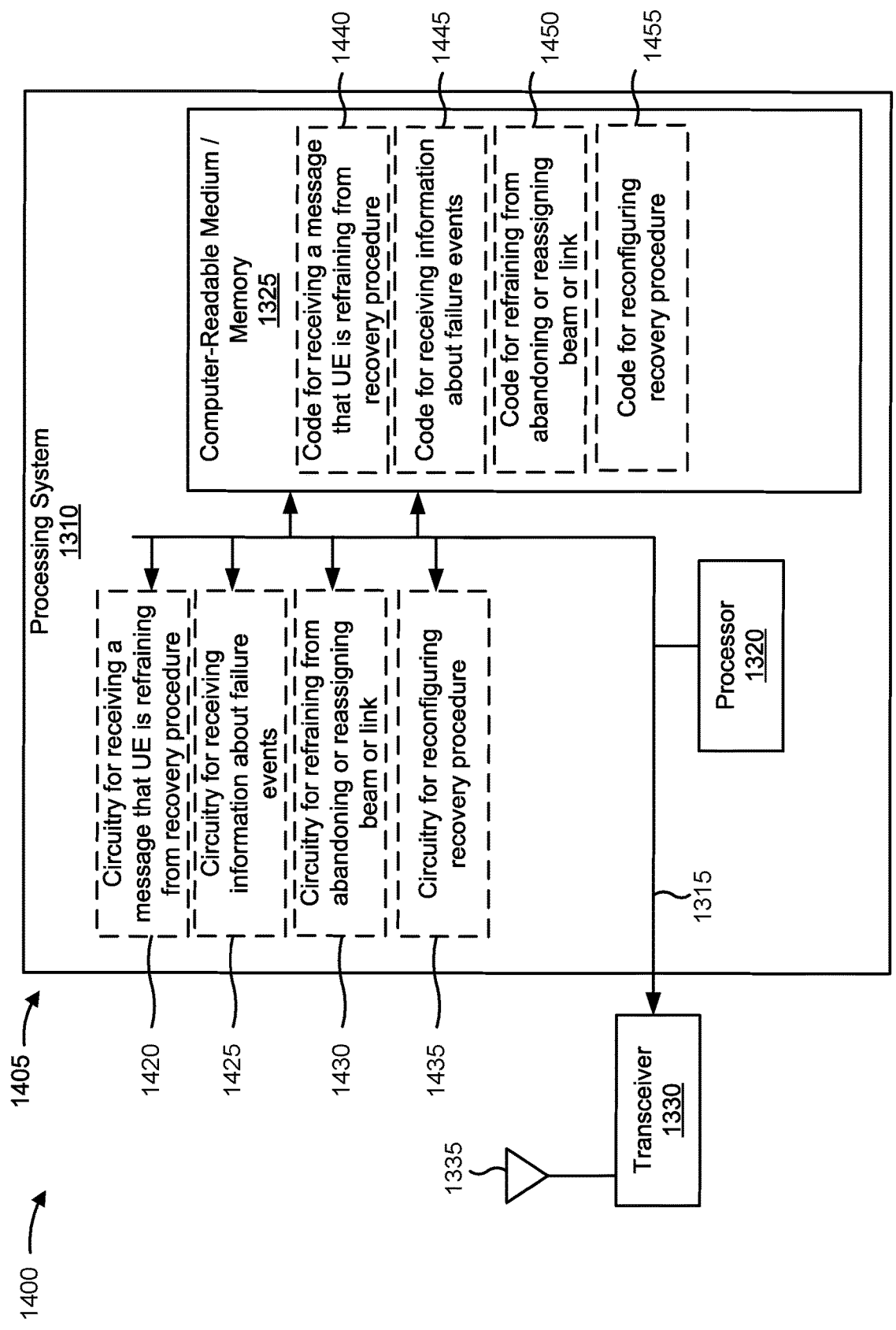
FIG. 14 is a diagram illustrating an example of an implementation of code and circuitry for an apparatus, in accordance with the present disclosure.

FIG. 14 is a diagram illustrating an example 1400 of an implementation of code and circuitry for an apparatus 1405. Apparatus 1405 may be a base station.

As further shown in FIG. 14, the apparatus may include circuitry for receive a message from a UE indicating that the UE is refraining (e.g., has refrained or will refrain) from performing a recovery procedure for a time duration after a failure event for a beam or a link (circuitry 1420). For example, the apparatus may include circuitry to enable the apparatus to receive a message from a UE indicating that the UE is refraining (e.g., has refrained or will refrain) from performing a recovery procedure for a time duration after a failure event for a beam or a link.

As further shown in FIG. 14, the apparatus may include circuitry for receiving a message from a UE indicating information associated with one or more failure events experienced by the UE or that occurred for a beam or a link between the UE and the base station (circuitry 1425). For example, the apparatus may include circuitry to enable the apparatus to receive a message from a UE indicating information associated with one or more failure events experienced by the UE or that occurred for a beam or a link between the UE and the base station.

As further shown in FIG. 14, the apparatus may include circuitry for refraining from abandoning or reassigning the beam or the link for the time duration (circuitry 1430). For example, the apparatus may include circuitry to enable the apparatus to refrain from abandoning or reassigning the beam or the link for the time duration.

As further shown in FIG. 14, the apparatus may include circuitry for reconfiguring a recovery procedure for the UE based at least in part on the information associated with the one or more failure events (circuitry 1435). For example, the apparatus may include circuitry to enable the apparatus to reconfigure a recovery procedure for the UE based at least in part on the information associated with the one or more failure events.

As further shown in FIG. 14, the apparatus may include, stored in computer-readable medium 1325, code for receiving a message from a UE indicating that the UE is refraining (e.g., has refrained or will refrain) from performing a recovery procedure for a time duration after a failure event for a beam or a link (code 1440). For example, the apparatus may include code that, when executed by the processor 1320, may cause processor 1320 to cause transceiver 1330 to receive a message from a UE indicating that the UE is refraining (e.g., has refrained or will refrain) from performing a recovery procedure for a time duration after a failure event for a beam or a link.

As further shown in FIG. 14, the apparatus may include, stored in computer-readable medium 1325, code for receiving a message from a UE indicating information associated with one or more failure events experienced by the UE or that occurred for a beam or a link between the UE and the base station (code 1445). For example, the apparatus may include code that, when executed by processor 1320, may cause processor 1320 to cause transceiver 1330 to receive a message from a UE indicating information associated with one or more failure events experienced by the UE or that occurred for a beam or a link between the UE and the base station.

As further shown in FIG. 14, the apparatus may include, stored in computer-readable medium 1325, code for refrain from abandoning or reassigning the beam or the link for the time duration configuration (code 1450). For example, the apparatus may include code that, when executed by processor 1320, may cause processor 1320 to refrain from abandoning or reassigning the beam or the link for the time duration.

As further shown in FIG. 14, the apparatus may include, stored in computer-readable medium 1325, code for reconfiguring a recovery procedure for the UE based at least in part on the information associated with the one or more failure events (code 1455). For example, the apparatus may include code that, when executed by processor 1320, may cause processor 1320 to reconfigure a recovery procedure for the UE based at least in part on the information associated with the one or more failure events.

FIG. 14 is provided as an example. Other examples may differ from what is described in connection with FIG. 14.

Figure 15:
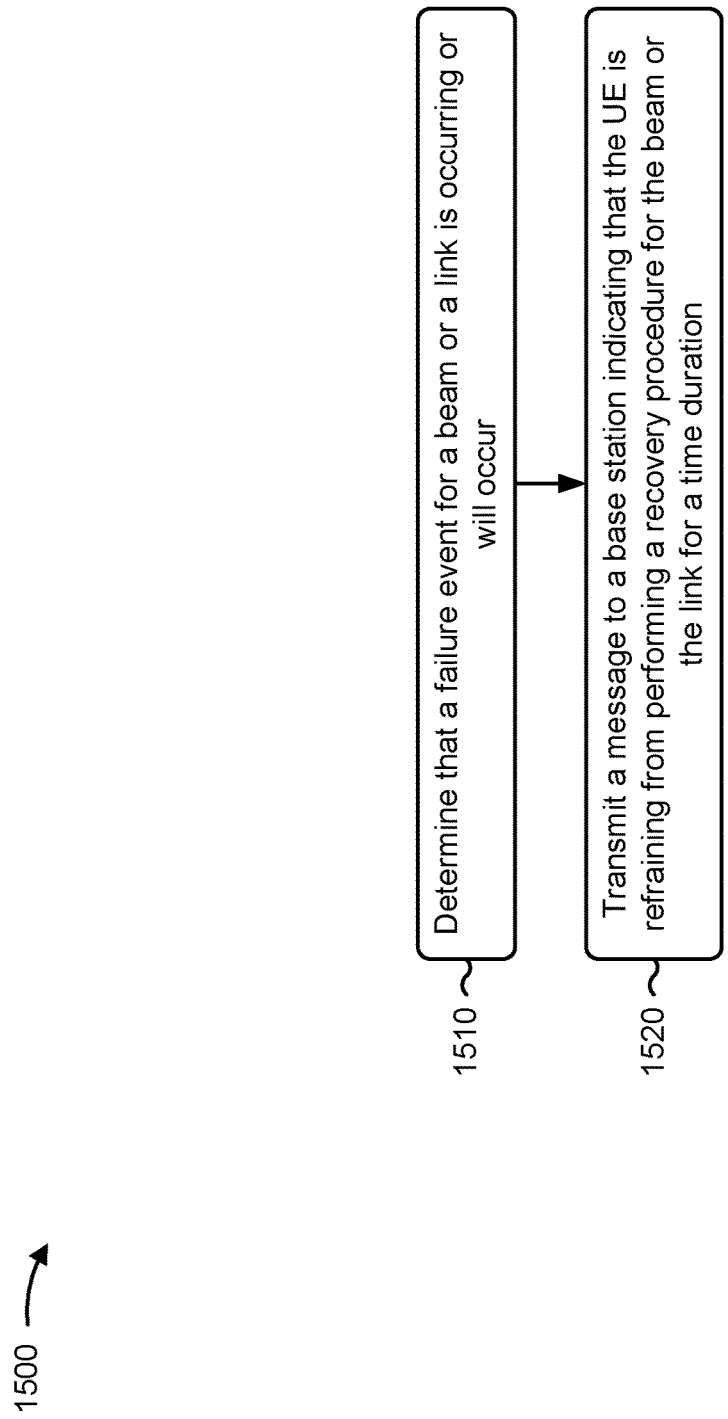
FIG. 15 is a diagram illustrating an example process performed, for example, by a UE, in accordance with the present disclosure.

FIG. 15 is a diagram illustrating an example process 1500 performed, for example, by a UE, in accordance with the present disclosure. Example process 1500 is an example where the UE (e.g., a UE 120 depicted in FIGS. 1 and 2, UE 320 depicted in FIG. 3, UE 420 depicted in FIG. 4) performs operations associated with suspension of beam or link recovery for a failure event.

As shown in FIG. 15, in some aspects, process 1500 may include determining that a failure event for a beam or a link, between the UE and a base station, is occurring or will occur (block 1510). For example, the UE (e.g., using receive processor 258, transmit processor 264, controller/processor 280, memory 282) may determine that a failure event for a beam or a link, between the UE and a base station, is occurring or will occur, as described above.

As further shown in FIG. 15, in some aspects, process 1500 may include transmitting a message to the base station indicating that the UE is refraining from performing a recovery procedure for the beam or the link for a time duration (block 1520). For example, the UE (e.g., using receive processor 258, transmit processor 264, controller/processor 280, memory 282) may transmit a message to the base station indicating that the UE is refraining from performing a recovery procedure for the beam or the link for a time duration, as described above.

Process 1500 may include additional aspects, such as any single aspect or any combination of aspects described below and/or in connection with one or more other processes described elsewhere herein.

In a first aspect, the time duration is based at least in part on a duration of one or more conditions causing the failure event.

In a second aspect, alone or in combination with the first aspect, the one or more conditions causing the failure event include one or more of an object blocking a path of the beam or the link and/or a maximum permissible exposure limitation for a human or part of a human in the path of the beam or the link.

In a third aspect, alone or in combination with one or more of the first and second aspects, the recovery procedure is a default recovery procedure.

In a fourth aspect, alone or in combination with one or more of the first through third aspects, the recovery procedure includes initiating a RACH procedure.

In a fifth aspect, alone or in combination with one or more of the first through fourth aspects, process 1500 includes canceling the recovery procedure.

In a sixth aspect, alone or in combination with one or more of the first through fifth aspects, process 1500 includes modifying one or more parameters for the recovery procedure.

In a seventh aspect, alone or in combination with one or more of the first through sixth aspects, the one or more parameters include one or more of a duration of a beam failure detection timer, a duration of a link failure detection timer, a maximum for a beam failure indication counter, or a maximum for a link failure indication counter.

In an eighth aspect, alone or in combination with one or more of the first through seventh aspects, the message is one of an RRC message, a MAC-CE, or a PUCCH message.

In a ninth aspect, alone or in combination with one or more of the first through eighth aspects, transmitting the message to the base station comprises determining a type of the failure event based at least in part on information associated with the failure event, and transmitting the message based at least in part on the type of the failure event.

In a tenth aspect, alone or in combination with one or more of the first through ninth aspects, transmitting the message to the base station includes transmitting the message based at least in part on a determination that the UE will satisfy a threshold probability of maintaining the beam or the link based at least in part on an internal state of an algorithm for finding another beam or another link.

In an eleventh aspect, alone or in combination with one or more of the first through tenth aspects, transmitting the message includes transmitting the message based at least in part on a determination that the failure event is about to occur.

In a twelfth aspect, alone or in combination with one or more of the first through eleventh aspects, the message indicates that the UE may refrain from performing the recovery procedure for the time duration for each of a plurality of failure events for the beam or the link.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
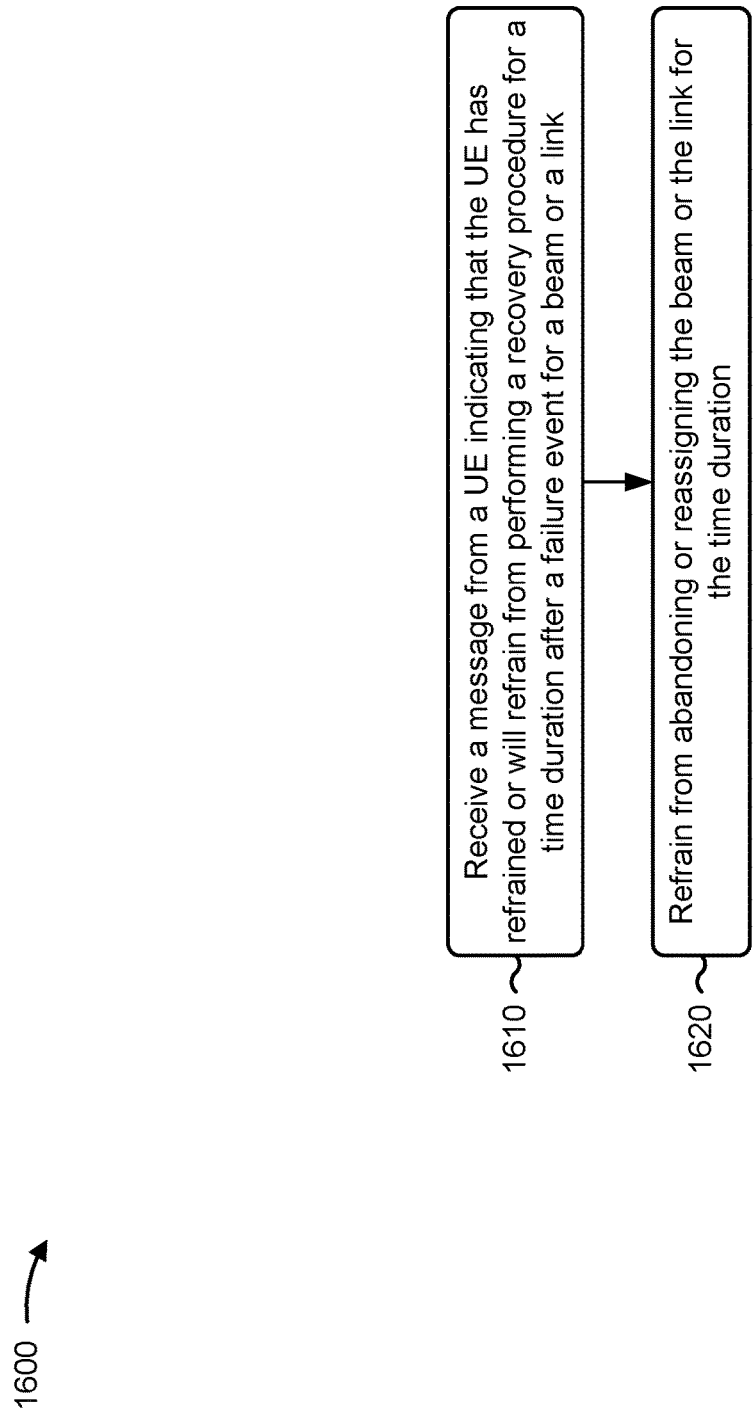
FIG. 16 is a diagram illustrating an example process performed, for example, by a base station, in accordance with the present disclosure.

FIG. 16 is a diagram illustrating an example process 1600 performed, for example, by a base station, in accordance with the present disclosure. Example process 1600 is an example where the base station (e.g., BS 110 depicted in FIGS. 1 and 2, BS 310 depicted in FIG. 3, BS 410 depicted in FIG. 4) performs operations associated with suspension of beam or link recovery for a failure event.

As shown in FIG. 16, in some aspects, process 1600 may include receiving a message from a UE indicating that the UE has refrained or will refrain from performing a recovery procedure for a time duration after a failure event for a beam or a link (block 1610). For example, the base station (e.g., using transmit processor 220, receive processor 238, controller/processor 240, memory 242) may receive a message from a UE indicating that the UE has refrained or will refrain from performing a recovery procedure for a time duration after a failure event for a beam or a link, as described above.

As further shown in FIG. 16, in some aspects, process 1600 may include refraining from abandoning or reassigning the beam or the link for the time duration (block 1620). For example, the base station (e.g., using transmit processor 220, receive processor 238, controller/processor 240, memory 242) may refrain from abandoning or reassigning the beam or the link for the time duration, as described above.

Process 1600 may include additional aspects, such as any single aspect or any combination of aspects described below and/or in connection with one or more other processes described elsewhere herein.

In a first aspect, process 1600 includes refraining from transmitting data to the UE during the time duration.

In a second aspect, alone or in combination with the first aspect, the recovery procedure is a default procedure.

In a third aspect, alone or in combination with one or more of the first and second aspects, the recovery procedure includes initiating a RACH procedure.

In a fourth aspect, alone or in combination with one or more of the first through third aspects, the message is one of an RRC message, a MAC-CE, or a PUCCH.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
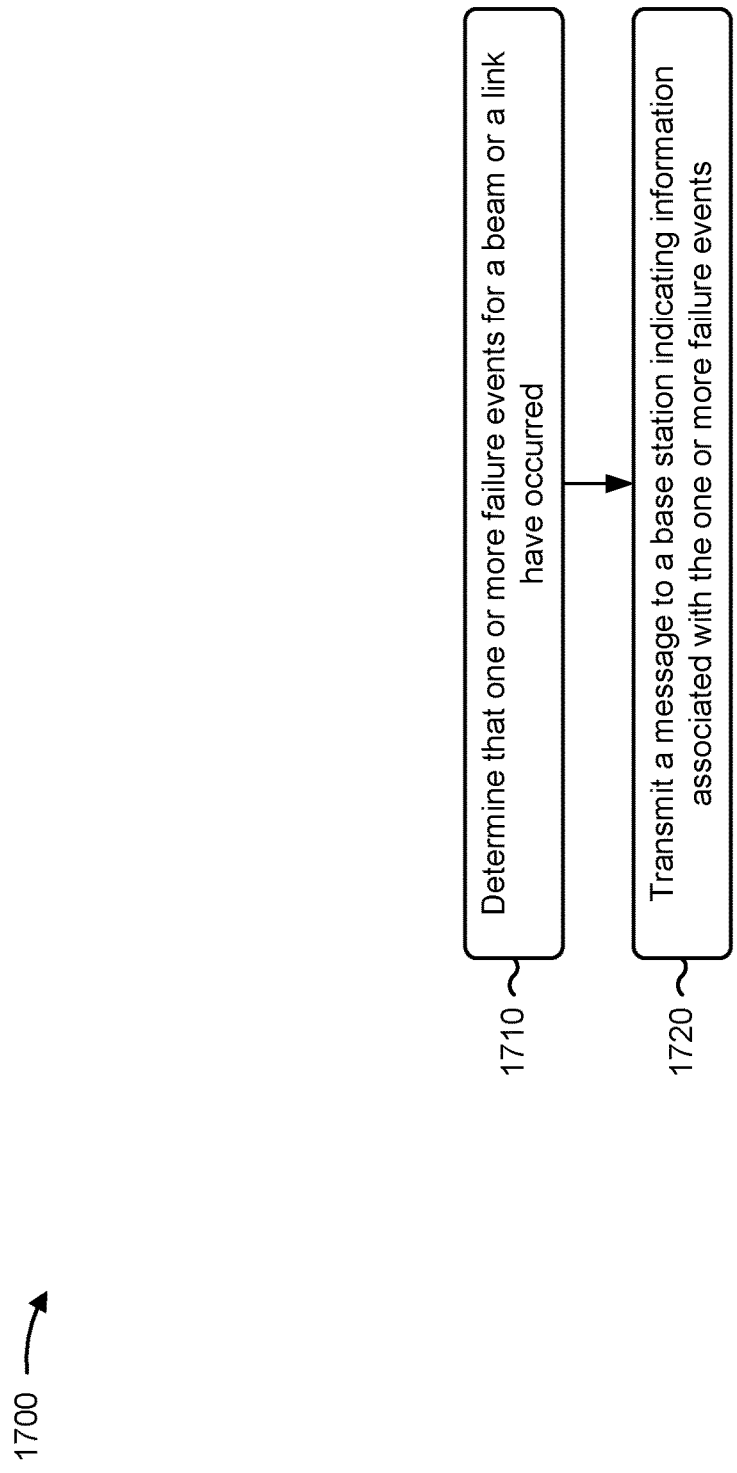
FIG. 17 is a diagram illustrating an example process performed, for example, by a UE, in accordance with the present disclosure.

FIG. 17 is a diagram illustrating an example process 1700 performed, for example, by an UE, in accordance with the present disclosure. Example process 1700 is an example where the UE (e.g., a UE 120 depicted in FIGS. 1 and 2, UE 320 depicted in FIG. 3, UE 420 depicted in FIG. 4) performs operations associated with suspension of beam or link recovery for a failure event.

As shown in FIG. 17, in some aspects, process 1700 may include determining that one or more failure events for a beam or a link, between the UE and a base station, have occurred (block 1710). For example, the UE (e.g., using receive processor 258, transmit processor 264, controller/processor 280, memory 282) may determine that one or more failure events for a beam or a link, between the UE and a base station, have occurred, as described above.

As further shown in FIG. 17, in some aspects, process 1700 may include transmitting a message, to the base station, indicating information associated with the one or more failure events (block 1720). For example, the UE (e.g., using receive processor 258, transmit processor 264, controller/processor 280, memory 282) may transmit a message, to the base station, indicating information associated with the one or more failure events, as described above.

Process 1700 may include additional aspects, such as any single aspect or any combination of aspects described below and/or in connection with one or more other processes described elsewhere herein.

In a first aspect, the one or more failure events is a single failure event and the information includes a failure duration for the single failure event.

In a second aspect, alone or in combination with the first aspect, the one or more failure events is a plurality of failure events and the information includes failure statistics for the plurality of failure events.

In a third aspect, alone or in combination with one or more of the first and second aspects, process 1700 includes modifying one or more parameters for a recovery procedure after receiving a reconfiguration of the recovery procedure from the base station.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
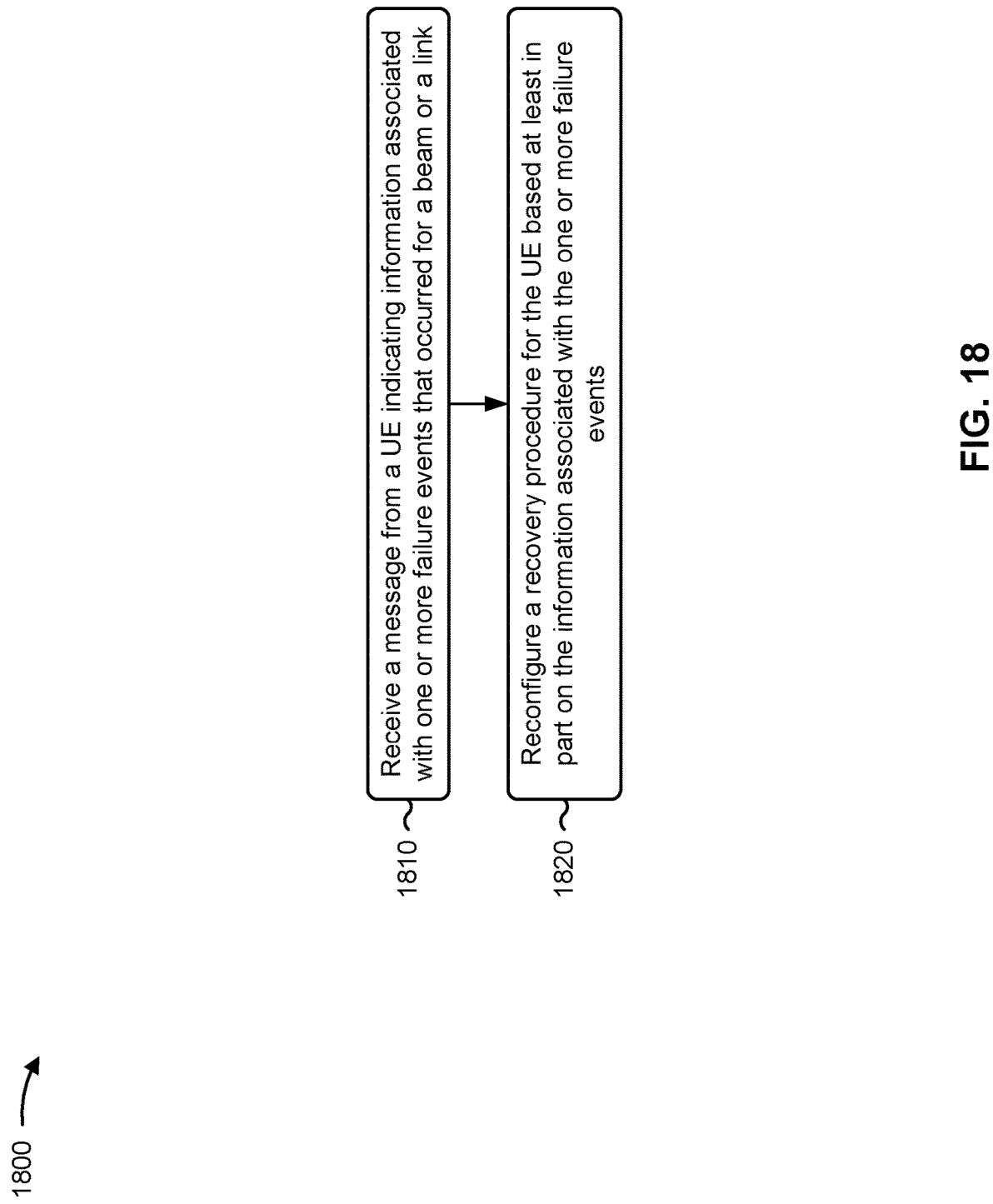
FIG. 18 is a diagram illustrating an example process performed, for example, by a base station, in accordance with the present disclosure.

FIG. 18 is a diagram illustrating an example process 1800 performed, for example, by a base station, in accordance with the present disclosure. Example process 1800 is an example where the base station (e.g., BS 110 depicted in FIGS. 1 and 2, BS 310 depicted in FIG. 3, BS 410 depicted in FIG. 4) performs operations associated with suspension of beam or link recovery for a failure event.

As shown in FIG. 18, in some aspects, process 1800 may include receiving a message from a UE indicating information associated with one or more failure events that occurred for a beam or a link between the UE and the base station (block 1810). For example, the base station (e.g., using transmit processor 220, receive processor 238, controller/processor 240, memory 242) may receive a message from a user equipment (UE) indicating information associated with one or more failure events that occurred for a beam or a link between the UE and the base station, as described above.

As further shown in FIG. 18, in some aspects, process 1800 may include reconfiguring a recovery procedure for the UE based at least in part on the information associated with the one or more failure events (block 1820). For example, the base station (e.g., using transmit processor 220, receive processor 238, controller/processor 240, memory 242) may reconfigure a recovery procedure for the UE based at least in part on the information associated with the one or more failure events, as described above.

Process 1800 may include additional aspects, such as any single aspect or any combination of aspects described below and/or in connection with one or more other processes described elsewhere herein.

In a first aspect, reconfiguring the recovery procedure includes updating one or more of a failure timer, a failure instance maximum count for the UE, or a combination of the failure timer and the failure instance maximum count.

In a second aspect, alone or in combination with the first aspect, the one or more failure events is a single failure event and the information includes a failure duration for the single failure event.

In a third aspect, alone or in combination with one or more of the first and second aspects, the one or more failure events is a plurality of failure events and the information includes failure statistics for the plurality of failure events.

In a fourth aspect, alone or in combination with one or more of the first through third aspects, process 1800 includes accelerating a radio link failure timer based at least in part on a beam failure indication.

In a fifth aspect, alone or in combination with one or more of the first through fourth aspects, process 1800 includes transmitting, to the UE, a reconfiguration of a recovery procedure after receiving the message.

Figure 19:
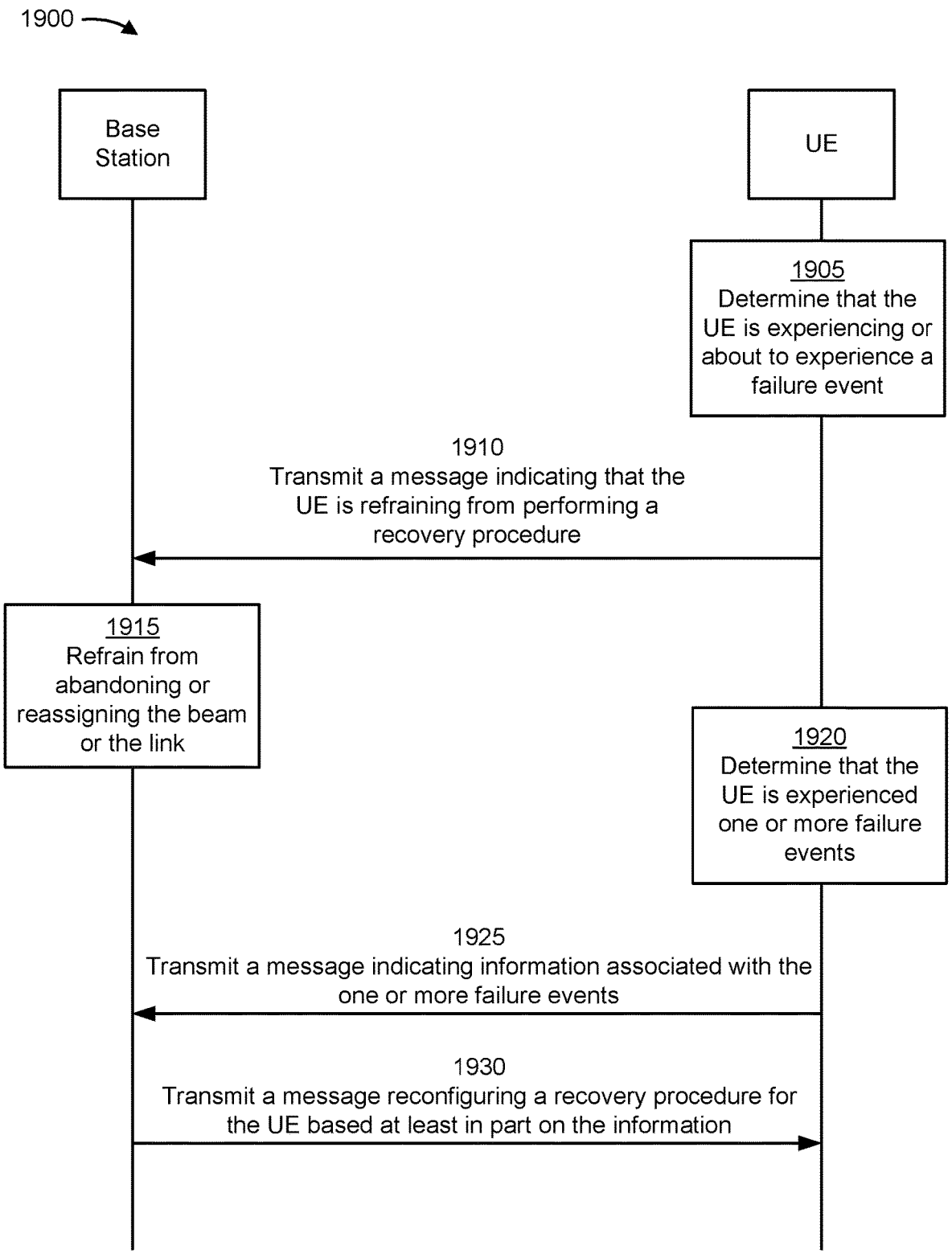
FIG. 19 is a diagram illustrating an example of suspension of beam or link recovery for a failure event, in accordance with the present disclosure.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel. FIG. 19 is a diagram illustrating an example 1900 of suspension of beam or link recovery for a failure event, in accordance with the present disclosure. As shown in FIG. 19, a UE (e.g., UE 120, UE 320, UE 420) may communicate (e.g., transmit an uplink transmission and/or receive a downlink transmission) with a base station (e.g., BS 110, BS 310, BS 410). The UE and the base station may be part of a wireless network (e.g., wireless network 100) and may follow procedures described in process 500 of FIG. 5, process 600 of FIG. 6, process 700 of FIG. 7, and process 800 of FIG. 8.

As shown by reference number 1905, the base station may determine that the UE is experiencing or is about to experience a failure event for a beam or a link. In some aspects, the UE may detect the failure event or receive information about the failure event.

As shown by reference number 1910, the UE may transmit a message to the base station indicating that the UE is refraining from performing a recovery procedure for the beam or the link for a time duration. For example, the UE may transmit a message indicated that the UE will not initiate a RACH procedure. As shown by reference number 1915, the UE may refrain from abandoning or reassigning the beam or the link.

As shown by reference number 1920, the UE may determine that the UE experienced one or more failure events for the beam or the link. The UE may have refrained from performing a recovery procedure. In some aspects, the UE may have later performed a recovery procedure if the failure event extended beyond the time duration.

As shown by reference number 1925, the UE may transmit a message indicating information associated with the one or more failure events. For example, the UE may collect information (e.g., block duration, number of failed instances for the block duration) for a failure event or statistics for multiple failure events.

As shown by reference number 1930, the base station may transmit a message to the UE that reconfigures a recovery procedure for the UE based at least in part on the information associated with the one or more failure events. For example, the base station may adjust a timer or count associated with beam failure or radio link failures.

As indicated above, FIG. 19 is provided as an example. Other examples may differ from what is described with regard to FIG. 19.

Figure 20:
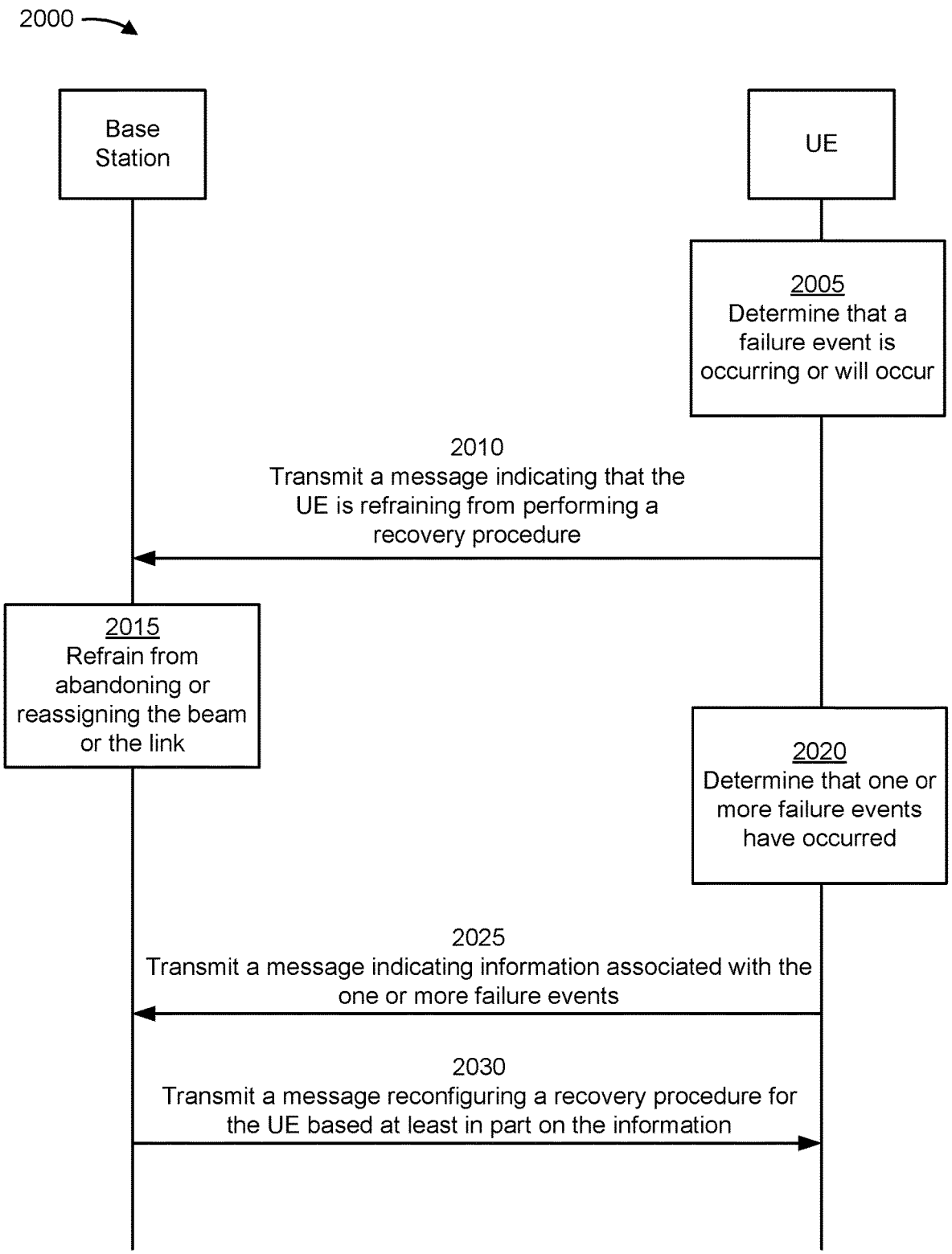
FIG. 20 is a diagram illustrating an example of suspension of beam or link recovery for a failure event, in accordance with the present disclosure.

FIG. 20 is a diagram illustrating an example 2000 of suspension of beam or link recovery for a failure event, in accordance with the present disclosure. As shown in FIG. 20, a UE (e.g., UE 120, UE 320, UE 420) may communicate (e.g., transmit an uplink transmission and/or receive a downlink transmission) with a base station (e.g., BS 110, BS 310, BS 410). The UE and the base station may be part of a wireless network (e.g., wireless network 100) and may follow procedures described in process 1500 of FIG. 15, process 1600 of FIG. 16, process 1700 of FIG. 17, and process 1800 of FIG. 18.

As shown by reference number 2005, the base station may determine that a failure event for a beam or a link, between the UE and a base station, is occurring or will occur. In some aspects, the UE may detect the failure event or receive information about the failure event.

As shown by reference number 2010, the UE may transmit a message to the base station indicating that the UE is refraining from performing a recovery procedure for the beam or the link for a time duration. For example, the UE may transmit a message indicated that the UE will not initiate a RACH procedure.

As shown by reference number 2015, the UE may refrain from abandoning or reassigning the beam or the link. For example, the UE may toll a timer, halt a counter, or perform another action for another UE instead of dropping the beam or the link to the UE.

As shown by reference number 2020, the UE may determine that one or more failure events for the beam or the link, between the UE and the base station, have occurred. The UE may have refrained from performing a recovery procedure.

In some aspects, the UE may have later performed a recovery procedure if the failure event extended beyond the time duration.

As shown by reference number 2025, the UE may transmit a message indicating information associated with the one or more failure events. For example, the UE may collect information (e.g., block duration, number of failed instances for the block duration) for a failure event or statistics for multiple failure events.

As shown by reference number 2030, the base station may transmit a message to the UE that reconfigures a recovery procedure for the UE based at least in part on the information associated with the one or more failure events. For example, the base station may adjust a timer or count associated with beam failure or radio link failures. The base station may also adjust the time duration for which the UE refrains from performing a recovery procedure.

As indicated above, FIG. 20 is provided as an example. Other examples may differ from what is described with regard to FIG. 20.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: determining that the UE is experiencing or is about to experience a failure event for a beam or a link; and transmitting a message to a base station indicating that the UE is refraining from performing a recovery procedure for the beam or the link for a time duration.

Aspect 2: The method of Aspect 1, wherein the time duration is based at least in part on a duration of one or more conditions causing the failure event.

Aspect 3: The method of Aspect 1 or 2, the one or more conditions causing the failure event include one or more of an object blocking a path of the beam or the link and/or a maximum permissible exposure limitation for a human or part of a human in the path of the beam or the link Aspect 4: The method of any of Aspects 1-3, wherein the recovery procedure is a default recovery procedure.

Aspect 5: The method of any of Aspects 1-4, wherein the recovery procedure includes initiating a random access channel procedure.

Aspect 6: The method of any of Aspects 1-4, further comprising canceling the recovery procedure.

Aspect 7: The method of any of Aspects 1-6, further comprising modifying parameters for the recovery procedure.

Aspect 8: The method of Aspect 7, wherein the parameters include one or more of a duration of a beam failure detection timer, a duration of a link failure detection timer, a maximum for a beam failure indication counter, or a maximum for a link failure indication counter.

Aspect 9: The method of any of Aspects 1-8, wherein the message is one of a radio resource control message, a medium access control control element, or a physical uplink control channel message.

Aspect 10: The method of any of Aspects 1-9, wherein transmitting the message to the base station includes determining a type of the failure event based at least in part on information associated with the failure event and transmitting the message based at least in part on the type of the failure event.

Aspect 11: The method of any of Aspects 1-10, wherein transmitting the message to the base station includes transmitting the message based at least in part on a determination that the UE will satisfy a threshold probability of maintaining the beam or the link based at least in part on an internal state of an algorithm for finding another beam or another link.

Aspect 12: The method of any of Aspects 1-11, wherein transmitting the message includes transmitting the message based at least in part on a determination that the UE is about to experience the failure event.

Aspect 13: The method of any of Aspects 1-12, wherein the message indicates that the UE may refrain from performing the recovery procedure for the time duration for each of a plurality of failure events for the beam or the link.

Aspect 14: A method of wireless communication performed by a base station, comprising: receiving a message from a user equipment (UE) indicating that the UE is refraining from performing a recovery procedure for a time duration after a failure event for a beam or a link; and refraining from abandoning or reassigning the beam or the link for the time duration.

Aspect 15: The method of Aspect 14, further comprising refraining from transmitting data to the UE during the time duration.

Aspect 16: The method of Aspect 14 or 15, wherein the recovery procedure is a default procedure.

Aspect 17: The method of any of Aspects 14-16, wherein the recovery procedure includes initiating a random access channel procedure.

Aspect 18: The method of any of Aspects 14-17, wherein the message is one of a radio resource control message, a medium access control control element, or a physical uplink control channel message.

Aspect 19: A method of wireless communication performed by a user equipment (UE), comprising: determining that the UE experienced one or more failure events for a beam or a link; and transmitting a message to a base station indicating information associated with the one or more failure events.

Aspect 20: The method of Aspect 19, wherein the one or more failure events is a single failure event and the information is a failure duration for the single failure event.

Aspect 21: The method of Aspect 19, wherein the one or more failure events is a plurality of failure events and the information is failure statistics for the plurality of failure events.

Aspect 22: A method of wireless communication performed by a base station, comprising: receiving a message from a user equipment (UE) indicating information associated with one or more failure events experienced by the UE for a beam or a link; and reconfiguring a recovery procedure for the UE based at least in part on the information associated with the one or more failure events.

Aspect 23: The method of Aspect 22, wherein reconfiguring the recovery procedure includes updating one or more of a failure timer, a failure instance maximum count for the UE, or a combination of the failure timer and the failure instance maximum count.

Aspect 24: The method of Aspect 22 or 23, wherein the one or more failure events is a single failure event and the information is a failure duration for the single failure event.

Aspect 25: The method of Aspect 22 or 23, wherein the one or more failure events is a plurality of failure events and the information is failure statistics for the plurality of failure events.

Aspect 26: The method of any of Aspects 22-25, further comprising determining whether to accelerate a radio link failure timer based at least in part on a beam failure indication.

Aspect 27: An apparatus for wireless communication at a device, comprising a processor; memory coupled with the processor; and instructions stored in the memory and executable by the processor to cause the apparatus to perform the method of one or more Aspects of Aspects 1-26.

Aspect 28: A device for wireless communication, comprising a memory and one or more processors coupled to the memory, the memory and the one or more processors configured to perform the method of one or more Aspects of Aspects 1-26.

Aspect 29: An apparatus for wireless communication, comprising at least one means for performing the method of one or more Aspects of Aspects 1-26.

Aspect 30: A non-transitory computer-readable medium storing code for wireless communication, the code comprising instructions executable by a processor to perform the method of one or more Aspects of Aspects 1-26.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 1-26.

The following provides an overview of some other Aspects of the present disclosure:

Aspect 32: A method of wireless communication performed by a user equipment (UE), comprising: determining that a failure event for a beam or a link, between the UE and a base station, is occurring or will occur; and transmitting a message to the base station indicating that the UE is refraining from performing a recovery procedure for the beam or the link for a time duration.

Aspect 33: The method of Aspect 32, wherein the time duration is based at least in part on a duration of one or more conditions causing the failure event.

Aspect 34: The method of Aspect 32 or 33, wherein the recovery procedure is a default recovery procedure.

Aspect 35: The method of any of Aspects 32-34, wherein the recovery procedure includes initiating a random access channel procedure.

Aspect 36: The method of any of Aspects 32-34, further comprising canceling the recovery procedure.

Aspect 37: The method of any of Aspects 32-36, further comprising modifying parameters for the recovery procedure.

Aspect 38: The method of Aspect 37, wherein the parameters include one or more of a duration of a beam failure detection timer, a duration of a link failure detection timer, a maximum for a beam failure indication counter, or a maximum for a link failure indication counter.

Aspect 39: The method of any of Aspects 32-38, wherein the message is one of a radio resource control message, a medium access control control element (MAC-CE), or a physical uplink control channel message.

Aspect 40: The method of any of Aspects 32-39, wherein transmitting the message to the base station includes determining a type of the failure event based at least in part on information associated with the failure event and transmitting the message based at least in part on the type of the failure event.

Aspect 41: The method of any of Aspects 32-40, wherein transmitting the message to the base station includes transmitting the message based at least in part on a determination that the UE will satisfy a threshold probability of maintaining the beam or the link based at least in part on an internal state of an algorithm for finding another beam or another link.

Aspect 42: The method of any of Aspects 32-41, wherein transmitting the message includes transmitting the message based at least in part on a determination that the failure event is about to occur.

Aspect 43: The method of any of Aspects 32-42, wherein the message indicates that the UE may refrain from performing the recovery procedure for the time duration for each of a plurality of failure events for the beam or the link.

Aspect 44: A method of wireless communication performed by a base station, comprising: receiving a message from a user equipment (UE) indicating that the UE has refrained or will refrain from performing a recovery procedure for a time duration after a failure event for a beam or a link; and refraining from abandoning or reassigning the beam or the link for the time duration.

Aspect 45: The method of Aspect 44, further comprising refraining from transmitting data to the UE during the time duration.

Aspect 46: The method of Aspect 44 or 45, wherein the recovery procedure is a default procedure.

Aspect 47: The method of any of Aspects 44-46, wherein the recovery procedure includes initiating a random access channel procedure.

Aspect 48: The method of any of Aspects 44-47, wherein the message is one of a radio resource control message, a medium access control control element (MAC-CE), or a physical uplink control channel message.

Aspect 49: A method of wireless communication performed by a user equipment (UE), comprising: determining that one or more failure events for a beam or a link, between the UE and a base station, has occurred; and transmitting a message, to the base station, indicating information associated with the one or more failure events.

Aspect 50: The method of Aspect 49, wherein the one or more failure events is a single failure event and the information includes a failure duration for the single failure event.

Aspect 51: The method of Aspect 49, wherein the one or more failure events is a plurality of failure events and the information includes failure statistics for the plurality of failure events.

Aspect 52: The method of any of Aspects 49-51, further comprising modifying one or more parameters for a recovery procedure after receiving a reconfiguration of the recovery procedure from the base station.

Aspect 53: A method of wireless communication performed by a base station, comprising: receiving a message from a user equipment (UE) indicating information associated with one or more failure events that occurred for a beam or a link between the UE and the base station; and reconfiguring a recovery procedure for the UE based at least in part on the information associated with the one or more failure events.

Aspect 54: The method of Aspect 53, wherein reconfiguring the recovery procedure includes updating one or more of a failure timer, a failure instance maximum count for the UE, or a combination of the failure timer and the failure instance maximum count.

Aspect 55: The method of Aspect 53 or 54, wherein the one or more failure events is a single failure event and the information includes a failure duration for the single failure event.

Aspect 56: The method of Aspect 53 or 54, wherein the one or more failure events is a plurality of failure events and the information includes failure statistics for the plurality of failure events.

Aspect 57: The method of any of Aspects 53-56, further comprising accelerating a radio link failure timer based at least in part on a beam failure indication.

Aspect 58: The method of any of Aspects 53-57, further comprising transmitting, to the UE, a reconfiguration of a recovery procedure after receiving the message.

Aspect 59: An apparatus for wireless communication at a device, comprising a processor; memory coupled with the processor; and instructions stored in the memory and executable by the processor to cause the apparatus to perform the method of one or more Aspects of Aspects 32-58.

Aspect 60: A device for wireless communication, comprising a memory and one or more processors coupled to the memory, the memory and the one or more processors configured to perform the method of one or more Aspects of Aspects 32-58.

Aspect 61: An apparatus for wireless communication, comprising at least one means for performing the method of one or more Aspects of Aspects 32-58.

Aspect 62: A non-transitory computer-readable medium storing code for wireless communication, the code comprising instructions executable by a processor to perform the method of one or more Aspects of Aspects 32-58.

Aspect 63: A non-transitory computer-readable medium storing a set of instructions for wireless communication, the set of instructions comprising one or more instructions that, when executed by one or more processors of a device, cause the device to perform the method of one or more Aspects of Aspects 32-58.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, and/or not equal to the threshold.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to cause the UE to:
      determine an occurrence of one or more failure events for a beam or a link between the UE and a network entity;
      transmit, to the network entity, a message that indicates;
         suspension of a recovery procedure for a time duration, and
         information associated with the one or more failure events, wherein the information associated with the one or more failure events includes one of:
            information associated with a number of failed instances for a block duration, or
            one or more statistics for a plurality of failure events that include the one or more failure events; and
      receive a reconfiguration, of the recovery procedure, that includes information associated with an adjustment to one or more beam failure detection parameters, wherein the adjustment to the one or more beam failure detection parameters is based on the information associated with the one or more failure events, and wherein the adjustment to the one or more beam failure detection parameters comprises a first adjustment to a duration of a beam failure detection timer, a second adjustment to a maximum for a beam instance counter, or both the first adjustment to the duration of the beam failure detection timer and the second adjustment to the maximum for the beam instance counter.

2. The apparatus of claim 1, wherein the block duration is a duration of an object blocking the beam or the link.

3. The apparatus of claim 1, wherein the information associated with the one or more failure events includes the information associated with the number of failed instances for the block duration.

4. The apparatus of claim 1, wherein the information associated with the one or more failure events includes the one or more statistics for the plurality of failure events.

5. The apparatus of claim 1, wherein the message is transmitted after each failure event of the plurality of failure events.

6. The apparatus of claim 1, wherein the message is transmitted after occurrence of the plurality of failure events.

7. The apparatus of claim 1, wherein the one or more processors are further configured to cause the UE to:
establish a connection with the network entity via the beam or the link.

8. The apparatus of claim 1, wherein the information associated with the one or more failure events further includes information that identifies the block duration.

9. The apparatus of claim 1, wherein, to receive the reconfiguration, the one or more processors are configured to cause the UE to:
receive, from the network entity, the reconfiguration.

10. The apparatus of claim 1, wherein the one or more processors are further configured to cause the UE to:
modify the one or more beam failure detection parameters based at least in part on the reconfiguration.

11. The apparatus of claim 10, wherein, to modify the one or more beam failure detection parameters, the one or more processors are configured to cause the UE to:
increase the maximum for the beam instance counter, or
increase the duration of the beam failure detection timer.

12. The apparatus of claim 1, wherein the occurrence of the one or more failure events are determined for the beam.

13. The apparatus of claim 1, wherein the occurrence of the one or more failure events are determined for the link.

14. A method of wireless communication performed at a user equipment (UE), comprising:
determining an occurrence of one or more failure events for a beam or a link between the UE and a network entity;
transmitting, to the network entity, a message that indicates;
suspension of a recovery procedure for a time duration, and
information associated with the one or more failure events, wherein the information associated with the one or more failure events includes one of:
information regarding a number of failed instances for a block duration, or
one or more statistics for a plurality of failure events that include the one or more failure events; and
receiving a reconfiguration, of the recovery procedure, that includes information regarding an adjustment to one or more beam failure detection parameters, the adjustment to the one or more beam failure detection parameters being based on the information associated with the one or more failure events, the adjustment to the one or more beam failure detection parameters comprising a first adjustment to a duration of a beam failure detection timer, a second adjustment to a maximum for a beam instance counter, or both the first adjustment to the duration of the beam failure detection timer and the second adjustment to the maximum for the beam instance counter.

15. The method of claim 14, wherein the block duration is a duration of an object blocking the beam or the link.

16. The method of claim 14, wherein the information associated with the one or more failure events includes the information regarding the number of failed instances for the block duration.

17. The method of claim 14, wherein the information associated with the one or more failure events includes the one or more statistics for the plurality of failure events.

18. The method of claim 14, wherein the message is transmitted after each failure event of the plurality of failure events.

19. The method of claim 14, wherein the message is transmitted after occurrence of the plurality of failure events.

20. The method of claim 14, further comprising:
establishing a connection with the network entity via the beam or the link.

21. The method of claim 14, wherein the information associated with the one or more failure events further includes information identifying the block duration.

22. The method of claim 14, wherein receiving the reconfiguration comprises:
receiving, from the network entity, the reconfiguration.

23. The method of claim 14, further comprising:
modifying the one or more beam failure detection parameters based at least in part on the reconfiguration.

24. The method of claim 23, wherein modifying the one or more beam failure detection parameters comprises one or more of:
increasing the maximum for the beam instance counter, or
increasing the duration of the beam failure detection timer.

25. The method of claim 14, wherein the occurrence of the one or more failure events are determined for the beam.

26. The method of claim 14, wherein the occurrence of the one or more failure events are determined for the link.

27. A non-transitory computer-readable medium storing a set of instructions for wireless communication, the set of instructions comprising:
one or more instructions that, when executed by one or more processors of a user equipment (UE), cause the UE to:
determine an occurrence of one or more failure events for a beam or a link between the UE and a network entity;
transmit, to the network entity, a message that indicates:
suspension of a recovery procedure for a time duration, and
information associated with the one or more failure events, wherein the information associated with the one or more failure events includes one of:
information associated with a number of failed instances for a block duration, or
one or more statistics for a plurality of failure events that include the one or more failure events; and
receive a reconfiguration, of the recovery procedure, that includes information associated with an adjustment to one or more beam failure detection parameters, wherein the adjustment to the one or more beam failure detection parameters is based on the information associated with the one or more failure events, and wherein the adjustment to the one or more beam failure detection parameters comprises a first adjustment to a duration of a beam failure detection timer, a second adjustment to a maximum for a beam instance counter, or both the first adjustment to the duration of the beam failure detection timer and the second adjustment to the maximum for the beam instance counter.

28. An apparatus for wireless communication, comprising:

means for determining an occurrence of one or more failure events for a beam or a link between the apparatus and a network entity;

means for transmitting, to the network entity, a message that indicates:
- suspension of a recovery procedure for a time duration, and
- information associated with the one or more failure events, wherein the information associated with the one or more failure events includes one of:
  - information regarding a number of failed instances for a duration, or
  - one or more statistics for a plurality of failure events that include the one or more failure events; and means for receiving a reconfiguration, of the recovery procedure, that includes information regarding an adjustment to one or more beam failure detection parameters, the adjustment to the one or more beam failure detection parameters being based on the information associated with the one or more failure events, the adjustment to the one or more beam failure detection parameters comprising a first adjustment to a duration of a beam failure detection timer, a second adjustment to a maximum for a beam instance counter, or both the first adjustment to the duration of the beam failure detection timer and the second adjustment to the maximum for the beam instance counter.

29. The non-transitory computer-readable medium of claim 27, wherein the one or more instructions, when executed by the one or more processors, further cause the UE to:
modify the one or more beam failure detection parameters based at least in part on the reconfiguration.

30. The apparatus of claim 28, further comprising:
means for modifying the one or more beam failure detection parameters based at least in part on the reconfiguration.

* * * * *